(12) United States Patent
Lu et al.

(10) Patent No.: US 12,128,913 B2
(45) Date of Patent: Oct. 29, 2024

(54) SYSTEMS AND METHODS FOR CALIBRATION OF SENSORS ON A VEHICLE

(71) Applicant: Lyft, Inc., San Francisco, CA (US)

(72) Inventors: David Tse-Zhou Lu, Menlo Park, CA (US); Christy Fernandez Cull, Sunnyvale, CA (US); Luca Del Pero, London (GB); Jonathan Mazur Dyer, Menlo Park, CA (US); Charles J Richey, Los Gatos, CA (US)

(73) Assignee: Lyft, Inc., San Francisco, CA (US)

( * ) Notice: Subject to any disclaimer, the term of this patent is extended or adjusted under 35 U.S.C. 154(b) by 735 days.

(21) Appl. No.: 17/075,569

(22) Filed: Oct. 20, 2020

(65) Prior Publication Data

US 2022/0118994 A1 Apr. 21, 2022

(51) Int. Cl.
*G06T 7/80* (2017.01)
*B60W 50/04* (2006.01)
*G06T 7/00* (2017.01)
*B60W 50/00* (2006.01)

(52) U.S. Cl.
CPC ............. *B60W 50/04* (2013.01); *G06T 7/80* (2017.01); *G06T 7/97* (2017.01); *B60W 2050/0083* (2013.01)

(58) Field of Classification Search
CPC . B60W 50/04; B60W 2050/0083; G06T 7/80; G06T 7/97; G06T 7/85
See application file for complete search history.

(56) References Cited

U.S. PATENT DOCUMENTS

2021/0033255 A1\* 2/2021 Kuffner, Jr. ........... G01S 7/4972
2023/0026584 A1\* 1/2023 Gitzen .................... B60R 11/04

\* cited by examiner

*Primary Examiner* — Kenneth J Malkowski
(74) *Attorney, Agent, or Firm* — Baker Botts L.L.P.

(57) ABSTRACT

Embodiments provide a hardware-based mechanism to continuously calibrate a set of sensors on a vehicle while the vehicle is in motion or in use. Specifically, each sensor is mounted on a respective rigid mounting device placed on the vehicle. A secondary sensing device for calibration is also rigidly mounted on the mounting device such that the relative position between the secondary device and the camera sensor can remain unchanged. The secondary sensing devices can then be used to detect a relative distance and/or position of the same calibration target. The sensed data is then used to determine, via stereo triangulation, the relative positions of the two secondary sensing devices, which in turn indicates the relative positions of the sensors.

18 Claims, 15 Drawing Sheets

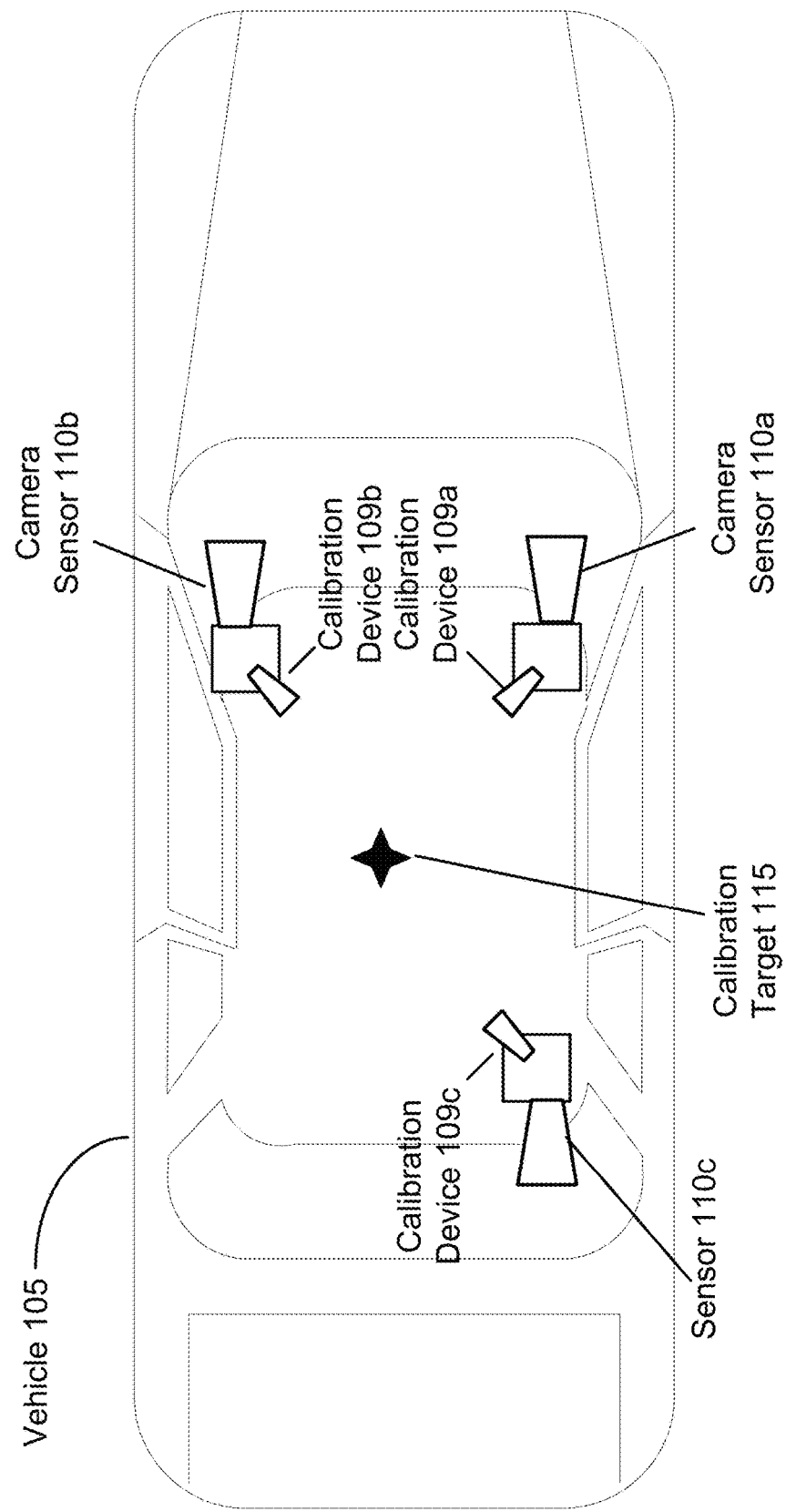

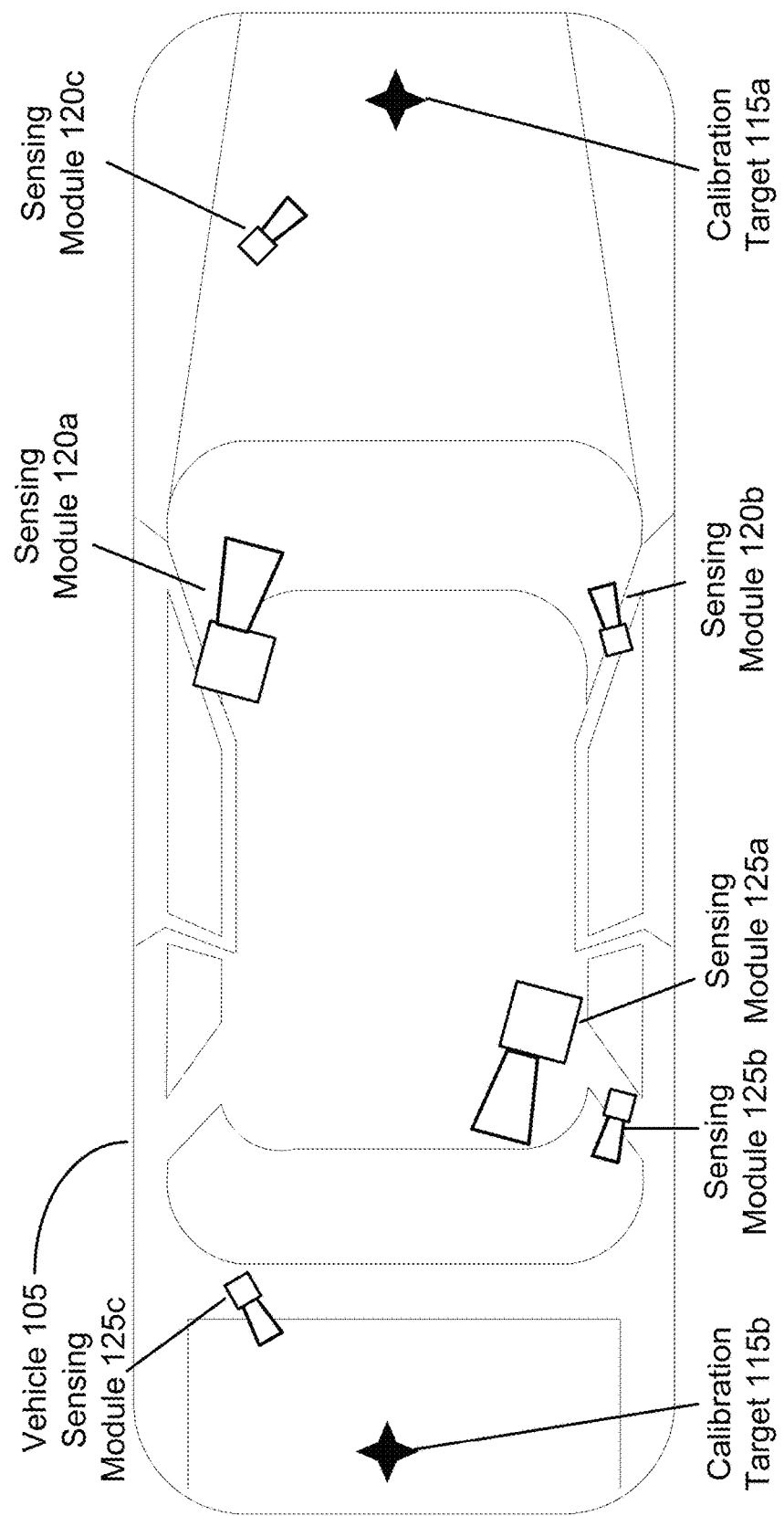

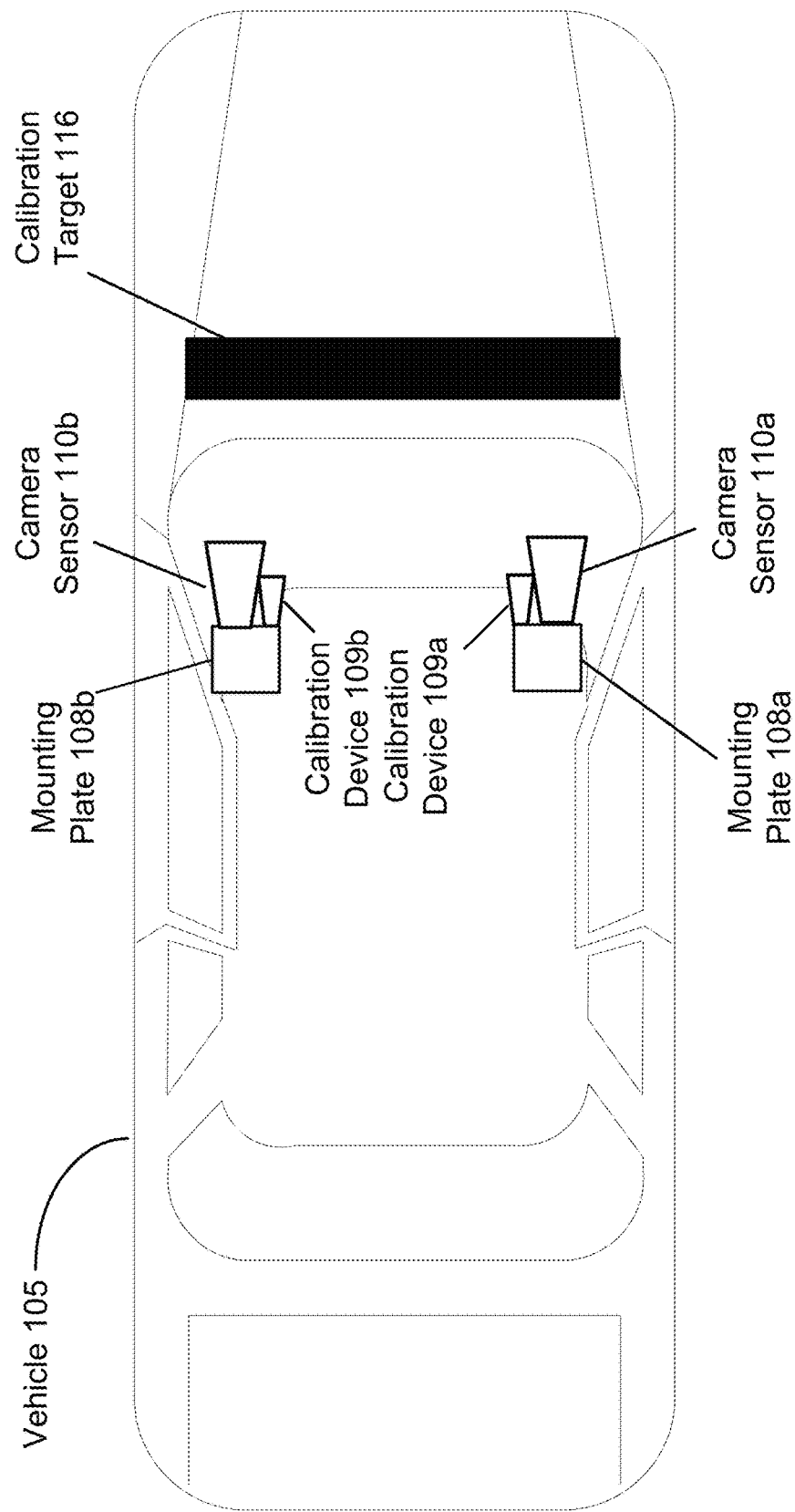

Data Signals 1015

SYSTEMS AND METHODS FOR CALIBRATION OF SENSORS ON A VEHICLE

FIELD OF THE INVENTION

The present technology relates to vehicle systems and navigation systems. More particularly, the present technology relates to systems, apparatus, and methods for calibration of sensors on a vehicle when the vehicle is in use or in motion.

BACKGROUND

Vehicles nowadays are sometimes equipped with a variety of sensors to perceive its surroundings and a computing system that processes the perceived data to generate images of the environment which can be used to generate detailed offline maps of locations (e.g., visual maps, etc.). In other examples, the sensors may be used to capture data to assist navigation, make control decisions for the vehicle, and/or the like. One example of such sensors may include a stereo camera pair installed on the vehicle to obtain stereo views that depict the surroundings in 3D. Specifically, the stereo camera pair includes two cameras placed in parallel, each of which takes an image of the same object from their respective positions, and the resulting images can be compared and analyzed to generate a 3D view of the object that simulates human binocular vision. Thus, the relative distance between and the orientations of the stereo camera pair thus need to be calibrated with high precision to ensure accuracy of the perceived image data. Similarly, to generate accurate imaging or sensing data of the environment, the relative positions between the sensors on the vehicle need to be carefully calibrated from time to time.

SUMMARY

Various embodiments of the present technology can include systems, methods, and non-transitory computer readable media configured to calibrate the positions of a set of sensors on a vehicle. A system for calibration of a set of sensors on a vehicle. The system includes a first sensing module that is mounted on the vehicle, which includes a first mounting plate that carries a first sensor of the set of sensors, and a second sensing module that is mounted on the vehicle, which includes a second mounting plate that is separate from the first mounting plate and carries a second sensor of the set of sensors. The first sensor and the second sensor are each configured to generate respective sensing data indicative of a respective position parameter of a calibration target on the vehicle. The system further includes a processor configured to receive the respective sensing data from the first sensor and the second sensor and determine a first relative position of the first sensor relative to the second sensor based on the respective position parameter of the calibration target.

In some implementations, the first sensor is fixed on the first mounting plate, and a first relative position parameter between the first sensor and the first mounting plate is known. The second sensor is fixed on the second mounting plate, and a second relative position parameter between the second sensor and the second mounting plate is constant.

In some implementations, the first sensor is a first calibration device, and the first sensing module further includes a first camera sensor that is fixed on the first mounting plate. A first relative position parameter between the first calibration device and the first camera sensor is known.

In some implementations, the second sensor is a second calibration device and the second sensing module further includes a second camera sensor that is fixed on the second mounting plate, and a second relative position parameter between the second calibration device and the second camera sensor is known. The respective sensing data generated by the first calibration device or the second calibration device is used to calibrate a second relative position between the first camera sensor and the second camera sensor.

In some implementations, the calibration target comprises any of: a feature of the vehicle, a physical object positioned on the vehicle, a passive calibration pattern placed on a surface of the vehicle, or an active calibration pattern that is projected on a surface of the vehicle.

In some implementations, a projector on the vehicle configured to project the active calibration pattern onto the surface of the vehicle. The processor is further configured to retrieve a pattern parameter relating to the active calibration pattern and determine the respective position parameter of the calibration target from the respective sensing data based at least in part on the pattern parameter.

In some implementations, the first sensor has a first field of view and the second sensor has a second field of view, and wherein the calibration target is located within an overlapping area of the first field of view and the second field of view.

In some implementations, the first sensor or the second sensor is any of: a camera sensor, a range imaging system, a laser interferometer, or a laser range finder.

In some implementations, the system further includes a third sensing module that is mounted on the vehicle. The third sensing module includes a third mounting plate that is detached from the first mounting plate and the second mounting plate and carries a third sensor of the set of sensors, and the third sensor is configured to generate additional sensing data indicative of an additional position parameter of the third sensor relative to the calibration target. The processor is further configured to determine an additional relative position of the first sensor or the second sensor relative to the third sensor based on the respective position parameter and the additional position parameter of the calibration target.

In some implementations, the respective sensing data captured by the first sensor or the second sensor includes at least one of: a measurement indicating a distance between the calibration target and the first sensor or the second sensor, or imaging data depicting a size or a shape of the calibration target from a point of view at the first sensor or the second sensor.

Embodiments described herein further provide a system for calibration of a set of sensors on a vehicle. The system includes a plurality of sensing modules that are detached from each other. Each of the plurality sensing modules includes a respective mounting plate and a respective sensor fixed on the respective mounting plate. Each respective sensor is configured to capture respective sensing data indicative of at least one respective position parameter of the respective sensor relative to a calibration target on the vehicle. The plurality of sensing modules are placed at positions where the calibration target is within a respective field of view of the each respective sensor. The system further includes a processor configured to generate one or more calibrated position parameters among the plurality sensing modules relative to each other based on the at least one respective parameter.

In some implementations, the plurality of sensing modules are placed to form a constellation within which the calibration target is placed at an overlapping area of fields of view corresponding to the plurality of sensing modules.

Embodiments described herein further provide a method for calibration of a set of sensors on a vehicle. The method includes obtaining, from a first sensing module including a first sensor that is mounted on the vehicle via a first mounting plate, first sensing data indicative of a first position parameter of the first sensor relative to a calibration target on the vehicle. The method further includes obtaining, from a second sensing module including a second sensor that is mounted on the vehicle via a second mounting plate, second sensing data indicative of a second position parameter of the second sensor relative to the calibration target on the vehicle. The first sensing module is detached from the second sensing module. The method further includes determining a relative position of the first sensor relative to the second sensor based on the first position parameter and the second position parameter.

In some implementations, the method further includes determining that the determined relative position is outside a threshold range of a previously stored relative position between the first sensor and the second sensor, updating the previously stored relative position with the determined relative position, and sending a command to re-calibrate the first sensor and the second sensor.

In some implementations, the method further includes retrieving a pattern parameter relating to the calibration target and determining the relative position of the first sensor relative to the second sensor from the first sensing data and the second sensing data based at least in part on the pattern parameter.

In some implementations, the first sensor is a first calibration device, and the first sensing module further includes a first camera sensor that is fixed on the first mounting plate, and the second sensor is a second calibration device and the second sensing module further includes a second camera sensor that is fixed on the second mounting plate. The method further comprises calibrating a second relative position between the first camera sensor and the second camera sensor using the first sensing data generated by the first sensor and the second sensing data generated by the second sensor.

In some implementations, the method further comprises obtaining, from a third sensor in a third sensing module that is mounted on the vehicle and is detached from the first sensing module and the second sensing module, third sensing data indicative of a third position parameter of the third sensor relative to the calibration target. The third sensing module includes a third mounting plate that is detached from the first mounting plate and the second mounting plate, and carries the third sensor of the set of sensors. The method further comprises determining a second relative position of the first sensor or the second sensor relative to the third sensor based on the first position parameter, the second position parameter and the third position parameter.

It should be appreciated that many other features, applications, embodiments, and variations of the disclosed technology will be apparent from the accompanying drawings and from the following detailed description. Additional and alternative implementations of the structures, systems, non-transitory computer readable media, and methods described herein can be employed without departing from the principles of the disclosed technology.

BRIEF DESCRIPTION OF THE DRAWINGS

FIG. 3A is a block diagram illustrating an example overview of a vehicle equipped with a constellation of detached sensing modules that are continuously calibrated with a calibration target, according to an embodiment of the present technology.

FIG. 4 is a block diagram illustrating an example overview of a vehicle equipped with different clusters of detached sensing modules calibrated with different calibration targets, according to an embodiment of the present technology.

FIG. 5A is a block diagram illustrating an example overview of a vehicle equipped detached sensing modules that are calibrated with a calibration stripe, according to an embodiment of the present technology.

Figure 1:
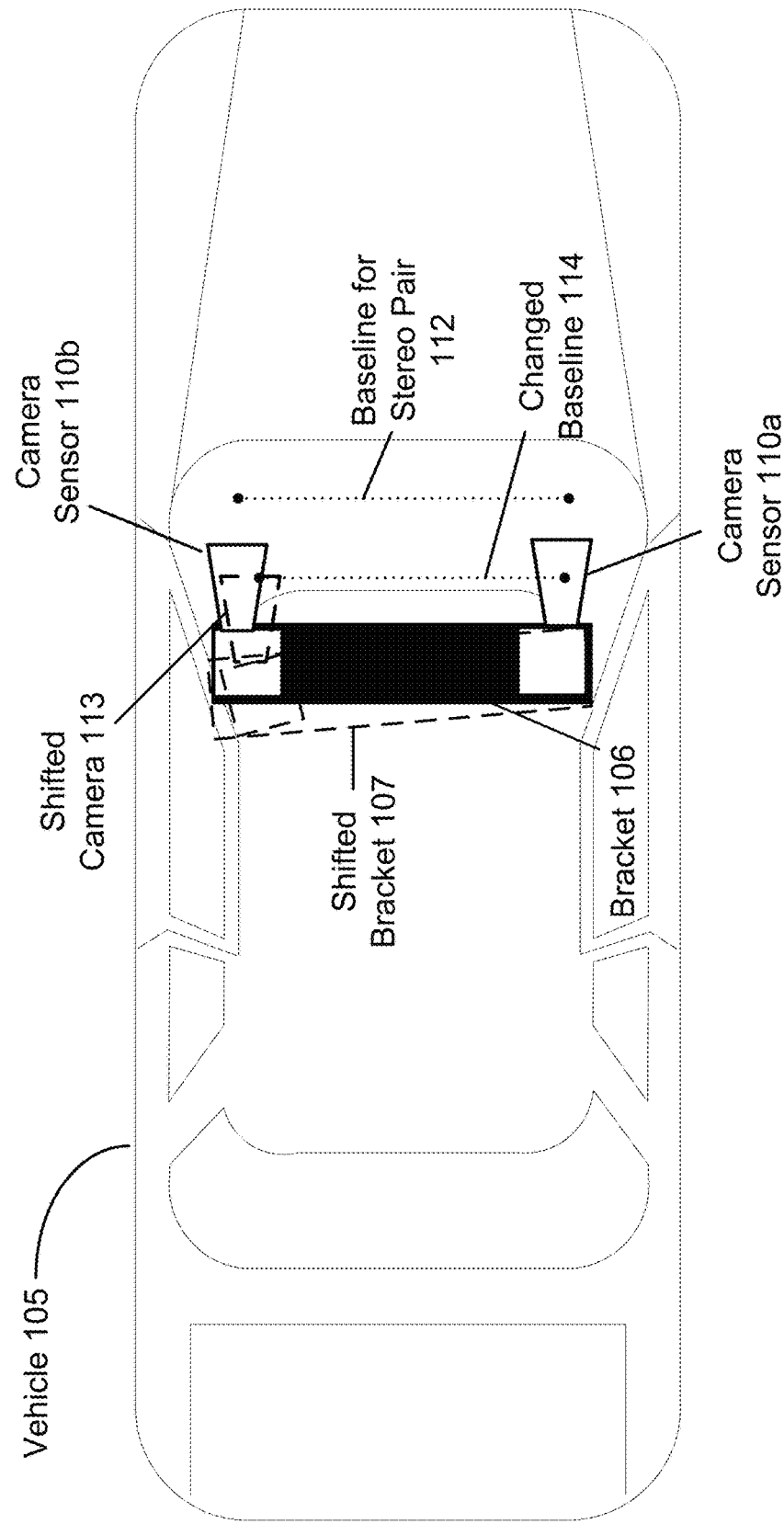
FIG. 1 is a block diagram illustrating an example overview of a vehicle equipped with a rigid placement bar or bracket to hold a stereo camera pair, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Vehicles are increasingly being equipped with intelligent features that allow them to monitor their surroundings and make informed decisions on how to react. Such vehicles, whether autonomously, semi-autonomously, or manually driven, may be capable of sensing their environment and navigating with little or no human input as appropriate. The vehicle may include a variety of systems and subsystems for enabling the vehicle to determine its surroundings to generate a visual map of the location, or to navigate to target destinations or assist a human driver, if one is present, with doing the same. As one example, a stereo camera pair can be installed on a vehicle to obtain stereo views that depict the surroundings in 3D. Specifically, the stereo camera pair includes two cameras placed in parallel, each of which takes an image of the same object from their respective positions, and the resulting images can be compared and analyzed to generate a 3D view of the object that simulates human binocular vision. The relative distance between and the orientations of the stereo pair thus need to be strictly calibrated with high precision to ensure accuracy of the perceived image data.

For another example, the placement position and the angle of other sensors, such as a camera-LiDAR may also need to be strictly calibrated, e.g., based on measurements/parameters to the ground coordinates of the LiDAR points.

When the stereo cameras or other sensors are installed on a vehicle, the movement of the vehicle may constantly cause vibration, jitter, or other slight movement that leads to position shifts of the stereo camera or other sensor, leaving the stereo camera or other sensor non-calibrated. This non-calibration issue may be even more prominent in the scenario when a wide-baseline stereo camera pair is installed on the vehicle. As used herein, the term "wide baseline" is used to refer to a distance between two stereo cameras that is similar to the width of the roof of the vehicle, e.g., at least three feet apart, etc. In contrast, the term "short baseline" is used to refer to a distance between two stereo cameras that is relatively smaller, e.g., less than three feet, etc. The wide baseline may facilitate the stereo cameras to capture visuals from a wider field of view depicting different facets of an object, as compared with visuals captured by stereo pairs with relatively shorter baseline (e.g., short-baseline stereo cameras that are only one foot or less apart). However, the wide-baseline stereo camera pair may suffer a greater position deviation as compared with a short baseline pair, because the wide-baseline stereo cameras are further apart from each other at different parts on the roof of the vehicle, and are thus more susceptible to different motions. Also, the wide baseline between the two stereo cameras may further amplify even the slightest position shifts into significant inaccuracy while aggregating visuals captured by the wide-baseline stereo cameras from the two stereo cameras into 3-D image data of the object.

Traditionally, to calibrate a wide-baseline stereo pair, a placement bar of length as the wide baseline is used to hold the wide-baseline stereo cameras. The length of the placement bar is used as the baseline parameter in generating 3D image data based on images captured by the two stereo cameras from their respective points of view. However, because of its size, the placement bar of such length may still be susceptible to motion instability that may lead to position shifts of the stereo cameras. For another example, environmental factors such as temperature, humidity, wind, and/or the like, may lead to non-trivial changes in shape, size and curve of the placement bar, which also affects the calibration of the stereo camera pair. Thus, the stereo cameras, even if fixed on the placement bar, may constantly deviate from the factory calibrated alignment provided by the placement bar as the vehicle is in motion or in use, leaving the stereo cameras largely non-calibrated while in use.

In general, a shorter baseline may provide better calibration stability of the stereo pair but with limited stereo vision, while a wide baseline can afford wider fields of view but the calibration stability may be compromised. Traditional vehicle systems can only pursue a tradeoff between calibration stability and 3D image data performance.

In addition, placing the stereo cameras on a rigid placement bar, or similarly, placing various sensors such as cameras, radars, Lidars, and/or the like, on a baseplate to maintain their relative positions can be both expensive and aesthetically unappealing. The shape, curve and ridges of the exterior of the vehicle also limits the size and position of the bar or baseplate, allowing only limited options to install sensors on the vehicle. For example, the curve of the roof of the vehicle may limit the length of the placement bar, and in turn limit the field of view of the stereo pair.

In addition, existing calibration systems often require that the vehicle equipped with various sensors such as the stereo camera pair be brought to specific calibration locations such as a factory where the stereo cameras can be calibrated, such as placing the vehicle on a turntable to capture fixed targets positioned throughout a room as the vehicle rotates. Such existing offline calibration methods fail to enable calibration to assist accurate 3-D imaging when the vehicle is in motion or in use.

In view of the need for convenient and accurate calibration for sensors on a vehicle, and in particular for wide baseline stereo pairs, embodiments described herein provide a hardware-based mechanism to continuously calibrate the set of sensors equipped on the vehicle while the vehicle is in motion or in use. As used herein, the term "continuous calibration" is used to refer to a calibration method, process and/or mechanism that provides calibration constantly, intermittently, periodically, or on an on-demand basis when the vehicle is in motion or in use. For example, "continuous calibration" may take place every few seconds, minutes or other time period. "Continuous calibration" also contrasts with the existing offline calibration which only happens at a factory setting. "Continuous calibration" can be implemented while the vehicle is traveling or located anywhere.

Specifically, instead of using a placement bar or baseplate to place the stereo pair or other sensors, embodiments described herein provide that each sensor is included in a sensing module that is mounted via a respective rigid mounting plate, on the vehicle. Each sensor is configured to detect a relative distance and/or position of a calibration target on the vehicle. The sensed data is then used to determine, e.g., via stereo triangulation, the relative positions among the sensors.

In some embodiments, the sensor included in the sensing module can be a primary sensor that is used to assist the driving of the vehicle or any other functions associated with control and/or data analysis for the vehicle. In some embodiments, each sensing module may further include a secondary sensing device that is dedicated to capture sensing data with the calibration target to perform continuous calibration. The secondary sensing device for calibration, such as but not limited to a camera, a video camera, a laser range finder, a range imaging system, a laser interferometer, etc., is also rigidly mounted on the mounting plate as part of the sensing module such that the relative position between the secondary sensing device and the primary sensor can remain unchanged. Thus, when the secondary sensing devices are used to capture sensing data with the calibration target for calibration the relative positions among the secondary sensing devices, the calibration is in turn indicative of relative positions among the primary sensors.

In some embodiments, a physical calibration target can be permanently placed on the vehicle, such as a hood ornament, etc. In some embodiments, a passive calibration pattern may be placed or painted on the vehicle. In some embodiment, a projector may be equipped with the vehicle, which may project an active calibration pattern onto the vehicle.

In these ways, the sensing modules may be continuously calibrated using sensing data captured with the calibration target while the vehicle is in motion or use. The position parameters of the sensing modules can thus be continuously updated to enhance the accuracy of image data, such as stereo views of surroundings in 3D captured by a stereo camera pair.

In addition, without the use of any baseplate or placement bar, the sensing modules can be placed and positioned at different locations on the vehicle with maximum flexibility, as long as the calibration target is within the field of view of the sensing module. For example, a wide-baseline stereo camera pair can then be installed as two separate sensing modules without a long placement bar holding the camera pair. The installation of two separate sensing modules can then fully take advantage of the space on the roof of the vehicle to yield a wide field of view of the stereo cameras. As the stereo cameras are continuously calibrated while the vehicle is in motion or in use, the calibration accuracy of the wide-baseline stereo camera pair is not compromised. Thus, instead of only pursuing a tradeoff between calibration stability and 3D image data performance by the traditional placement bar fixed stereo systems, the hardware-based calibration mechanism described herein can achieve both accurate calibration and a wide field of view associated with a wide-baseline pair that yields high-quality 3D image data.

Furthermore, each sensing modules can be added to or removed from the vehicle on demand in a flexible and convenient manner. For example, in some situations, expensive sensing modules may be swapped out with more cost-effective sensing modules for customized use of the vehicle.

FIG. 1 is a block diagram 100 illustrating an example overview of a vehicle equipped with a rigid placement bar or bracket to hold a stereo camera pair, according to an embodiment of the present technology. Diagram 100 shows an elevated view of a vehicle 105 from above. A stereo camera pair including a first camera sensor 110a, and a second camera sensor 110b are placed on the top of the vehicle 105. The camera sensors 110a and 110b are placed in parallel with a distance apart, which is referred to as the baseline 112 for the stereo pair. To utilize image data captured by the stereo cameras 110a and 110b to reconstruct a 3-D image of an object, ideally the baseline 112 and/or the orientations of the cameras 110a-b shall remain constant.

As shown in FIG. 1, the camera sensors 110a and 110b form a wide-baseline stereo pair as the baseline 112 is similar to the width of the roof of vehicle 105, to gain a wide field of view for the stereo pair. Traditionally, the camera sensors 110a-b are fixed at two ends of a rigid placement bar or bracket 106 having the length of the baseline 112, which is mounted on top of the vehicle 105 to maintain their relative positions. In this case, the baseline 112 is presumed to the length of the bracket 106 which is pre-calibrated, e.g., at a factory setting. However, the presumption that the bracket 106 would always hold the baseline 112 unchanged for the camera sensors 110a-b when the vehicle 105 is in motion or in use can largely be untrue. For example, the shape, size, curvature, and even the position of the bracket 106 may change due to thermal expansion or contraction, vehicle vibration or jitter during movement, and/or the like, causing the baseline 112 to change and thus the camera sensors 110a-b may go out of alignment. As shown in FIG. 1, for instance, when the bracket 106 (illustrated in solid black rectangle) shifts to a new position (illustrated by the rectangle in dashed line) at 107 due to one or more of the factors described above, the mounted camera sensor 110b may shift to a new position at 113. Thus, the relative position between the shifted camera 113 and the camera sensor 110a may result in the changed baseline 114. When the alignment of camera sensors is not strictly calibrated, the original baseline for the stereo pair 112 is still used for generating stereo images captured by camera 110a and the shifted camera 113, while the actual baseline between camera 110a and the shifted camera 113 is the changed baseline 114. The resulting sensing data may not generate an accurate stereo view of the surroundings.

In particular, as previously described, for wide baseline stereo cameras, the bracket 106 has a wide length, e.g., similar to the width of the roof of the vehicle, to hold the camera sensors 110a-b and thus may be more susceptible to vehicle vibration or other motions than a shorter bracket holding a short baseline stereo pair. As the length of baseline is an important parameter in aggregating visuals of the object captured by the stereo pair, any slight non-calibrated change in the wide baseline may lead to greater inaccuracy in 3D image data generation as compared with that with a short baseline. However, stereo cameras mounted on a shorter bracket may have a compromised field of view because the baseline between the stereo camera pair is limited. Thus, when a wide baseline stereo camera pair is desired for a wider field of view, the calibration issue of the wide baseline stereo camera pair may be prominent.

In addition, the installation of an extra placement bar on a vehicle can be both expensive and aesthetically unappealing, and largely restricted by the design of the vehicle 105 such as the shape, curve and ridges of the exterior of the vehicle 105. On the other hand, the rigid placement bar or racket 106 also conversely limits the locations of sensors. Thus, instead of using such a rigid placement bar or bracket 106, various embodiments of a flexible hardware-based mechanism that provides accurate and continuous calibration of sensors is shown in FIGS. 2A-7. Specifically, by freeing the stereo camera sensors 110a-b from rigid mechanical placement, the stereo baseline, e.g., the distance between the stereo camera sensors 110a-b, may be extended to enlarge the range of field of view of the stereo pair. As further illustrated in FIGS. 2A-7, the stereo camera sensors 110a-b may be mounted at different locations on the vehicle with great flexibility, as long as the stereo camera sensors 110a-b have overlapping fields of view.

Figure 2A:
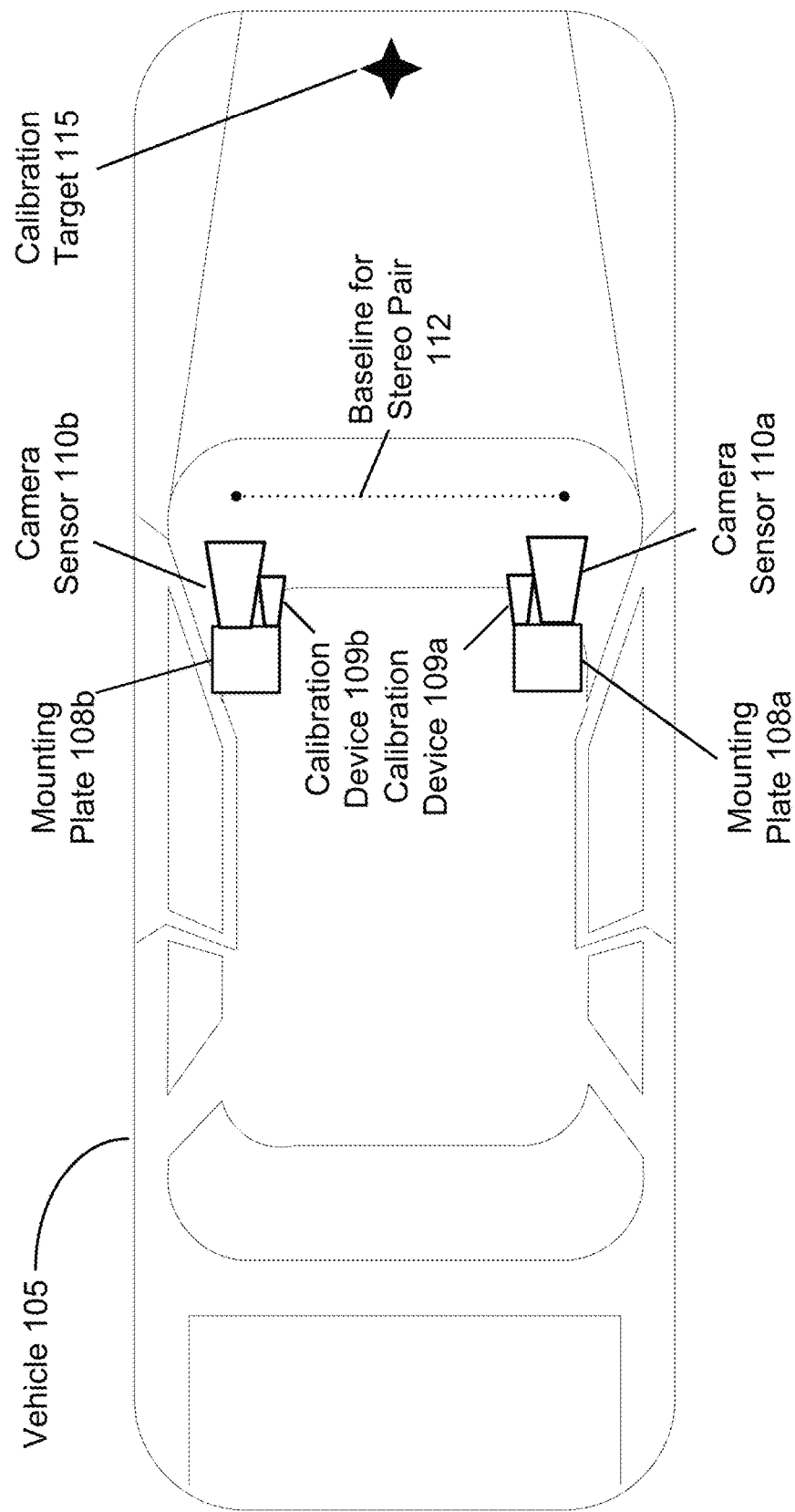
FIG. 2A is a block diagram illustrating an example overview of a vehicle equipped with detached sensing modules that can be calibrated with a calibration target on the vehicle, according to an embodiment of the present technology.

FIG. 2A is a block diagram 200a illustrating an example overview of a vehicle equipped with detached sensing modules that can be continuously calibrated with a calibration target on the vehicle, according to an embodiment of the present technology. Block diagram 200a shows that the vehicle 105, instead of using a rigid placement bar or bracket to hold camera sensors, each camera sensor 110a or 110b is fixed on a mounting plate 108a or 108b, respectively. The mounting plates 108a and 108b are detached from each other.

Specifically, the camera sensor 110a may be welded to or otherwise rigidly joined together with the mounting plate 108a such that the relative positions between the mounting plate 108a and the stereo camera 110a remain unchanged. Similarly, the camera sensor 110b is welded to or otherwise rigidly joined together with the mounting plate 108b such that the relative positions between the mounting plate 108b and the stereo camera 110b remain unchanged. In this way, the combination of camera sensor 110a and the mounting plate 108a, and the combination of camera sensor 110b and the mounting plate 108b are each regarded as a sensing module. The distance between the sensing modules are calibrated, which in turn calibrates the baseline between the camera sensors 110a and 110b, as further described below.

In one embodiment, a calibration device 109a or 109b may each be installed at the mounting plate 108a or 108b, which may be used for calibrating the distance and/or relative positions of the stereo cameras 110a-b. For example, the calibration device 109a or 109b may also be welded to or otherwise rigidly joined together with the mounting plate 108a or 108b such that the relative positions between the mounting plate 108a (or 108b) and the calibration device 109a (or 109b) remain unchanged. In this way, the combination of the camera sensor 110a (or 110b), the mounting plate 108a (or 108b) and the calibration device 109a (or 109b) forms a sensing module. Within the sensing module, even if each mounting plate 108a or 108b may have constant position change due to the vibration, jitter caused by the movement of the vehicle 105, the relative position between the mounting plate 108a (or 108b), stereo camera 110b (or 110b) and the calibration device 109a (or 109b) remain unchanged. Therefore, the distance between the calibration devices 109a and 109b may be indicative of the baseline 112 between the camera sensor 110a and 110b. The calibration devices 109a and 109b can thus be configured to generate measurement indicative of the relative position therebetween, which can be used to calibrate the baseline 112 between the camera sensor 110a and 110b. Specifically, a calibration target 115 may be placed within an overlapping area of the fields of view of the calibration devices 109a and 109b to facilitate the calibration, as further described in FIG. 2B.

Figure 2B:
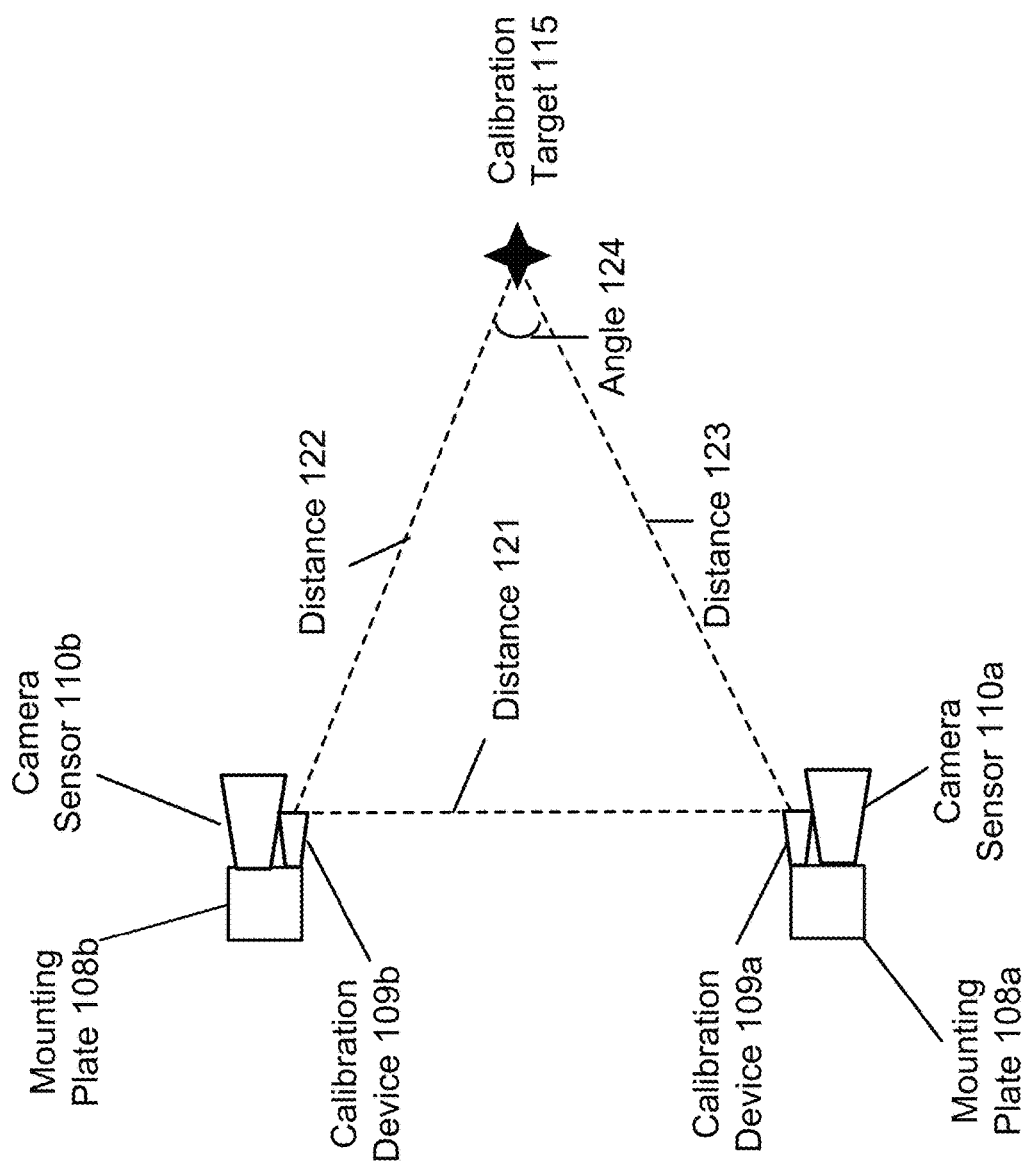
FIG. 2B provides an example diagram 200b showing an enlarged view illustrating the relationship between the calibration devices 109a-b, and a calibration target 115, according to one embodiment described herein.

FIG. 2B provides an example diagram 200b showing an enlarged view illustrating the relationship between the calibration devices 109a-b, and a calibration target 115, according to one embodiment described herein. In one embodiment, the two calibration devices 109a and 109b may use the same calibration target 115, whose position may be known to the calibration system on the vehicle 105.

In some implementation, the calibration target 115 may be a physical object (such as a hood ornament) that is mounted on the hood of the vehicle 105 at a position that is within the sensing or imaging range of each calibration device 109a or 109b. In some implementation, the calibration target may be a calibration pattern that is projected onto the hood or another part of the body of the vehicle 105, as long as the calibration pattern is within the field of view, or the sensing or imaging range of each calibration device 109a or 109b.

The calibration device 109a or 109b may be a sensing or imaging device (e.g., a Siamese camera, a laser range finder) that is capable of generating sensing or imaging data used for estimating a distance to and/or relative position of the calibration target relative to the respective calibration device 109a or 109b.

For example, in one implementation, the calibration device 109a or 109b may be a Siamese camera. The Siamese camera may be configured to capture imaging data of the calibration target 115 such that the length and/or a relative angle of the virtual line connecting the Siamese camera (e.g., calibration device 109a or 109b) can be inferred from the imaging data. In this way, distances 122 and 123, and the angle 124 may be inferred from the imaging data from the Siamese cameras, which can then be used to compute the distance 121 between the two calibration devices 109a-b, e.g., via triangulation. In another implementation, the Siamese cameras may also be configured to capture imaging data that contains characteristics of the calibration target 115, such as but not limited to the size, shape, color, pattern, and/or the like of the calibration target 115. For example, the imaging data captured by camera sensor 110a and imaging data captured by camera sensor 110b may each reflect a respective shape of the calibration target 115 that is deformed due to the respective position of the camera sensor. The different deformation of the shape may be used to compute the relative angle 124 between the calibration target 115 towards the camera sensors 110a-b.

In another embodiment, the calibration device 109a or 109b may be a laser range finder, which is configured to emit a laser beam towards the calibration target 115 and use the total transmission time of the return laser beam bounced off the calibration target 115 to estimate a distance 122 or 123 between the calibration device and the calibration target 115. In this case, the laser range finders may be positioned and oriented towards the calibration target 115 such that the angle 124 may be known. Thus, the measured distances 122 and 123 may be used to compute the distance 121 between the calibration devices 109a-b.

As the relative position between the camera sensor 110a (or 110b) and the corresponding calibration device 109a (or 109b) remain unchanged, the baseline 112 between the camera sensor 110a-b may thus be inferred based on the computed distance 121 between the two calibration devices 109a and 109b. For example, an updated/calibrated baseline may be computed by adding or subtracting a fixed offset distance from the computed distance 121 indicating the fixed relative position between the camera sensor 110a (or 110b) and the calibration device 109a (or 109b). In this way, the baseline 112 may be updated constantly, intermittently, periodically (e.g., every 20 seconds, 30 seconds, etc.), or otherwise on-demand when the vehicle 105 is in motion or in use. The updated baseline 112 and the relative angle between the stereo cameras 110a-b may be stored at a lookup table in a memory of the computing system at the vehicle 105. The computing system may then retrieve the updated baseline 112, the updated relative angle, and/or other position parameters to generate 3-D imaging data of the surrounding based on images captured by the camera sensor 110a-b.

In FIGS. 2A-2B, both camera sensors 110a-b are each accompanied with a secondary calibration device 109a-b, respectively, which is dedicated to generating sensing or imaging data towards the calibration target 115 for calibration. In this way, the camera sensor 110a-b can be dedicated to capturing objects in the environment without having to constantly shift focus from the surroundings to calibration target 115, or otherwise. Having a secondary dedicated calibration device 109a-b also alleviate the bandwidth requirements for the camera sensors 110a-b. For example, when the vehicle 105 is at a traffic stop, the camera sensor 110a-b may be configured to focus on and monitor the traffic light change and thus may not be able to assist continuous calibration.

Figure 2C:
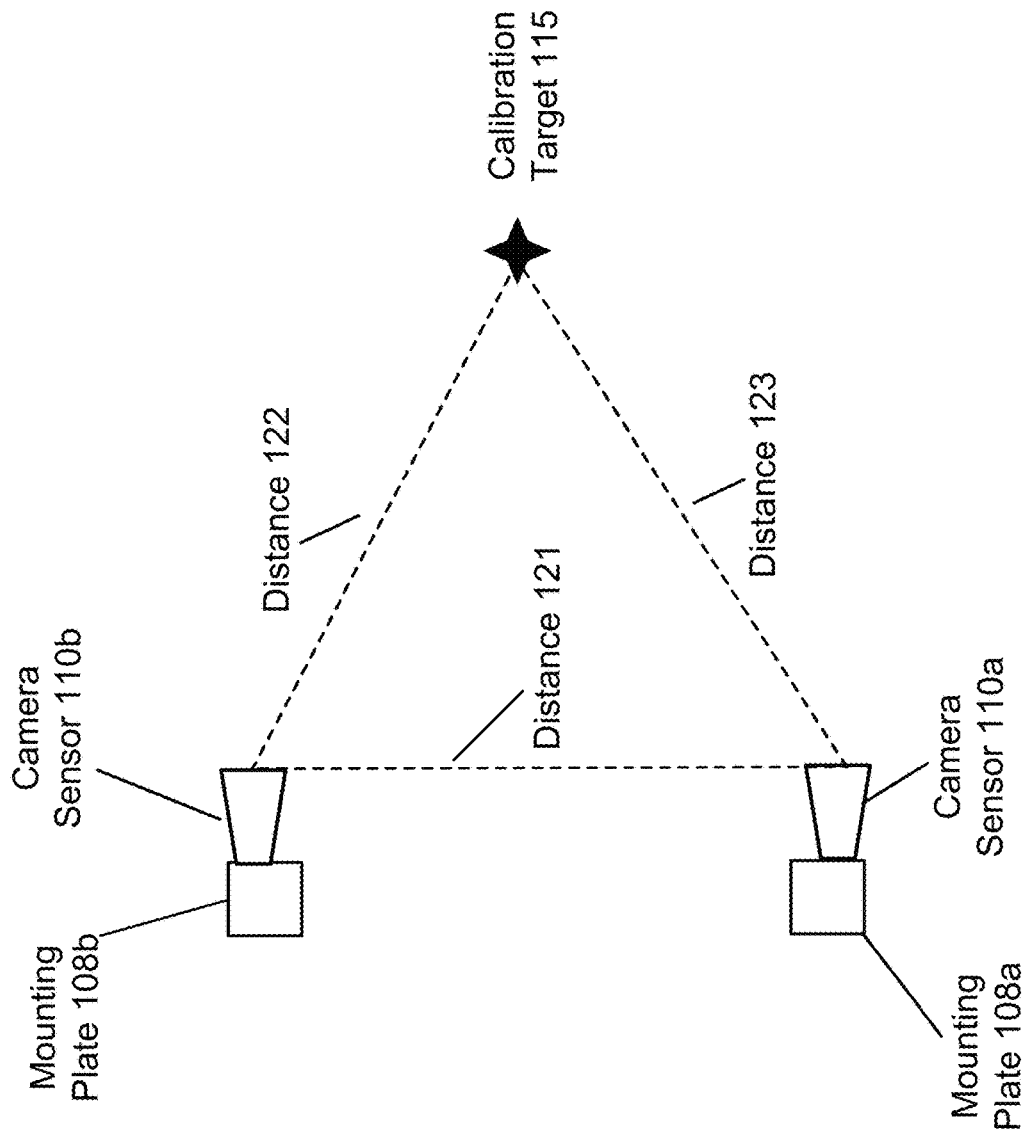
FIG. 2C provides an example diagram showing an enlarged view illustrating the relationship between the camera sensors and a calibration target but without a secondary calibration device, according to one embodiment described herein.

FIG. 2C provides an example diagram 200c showing an enlarged view illustrating the relationship between the camera sensors 110a-b, and a calibration target 115 but without a secondary calibration device, according to one embodiment described herein. For example, for cost concerns or restriction of the existing design of the mounting plates 108a-b, adding an additional calibration device to the mounting plate may not be cost-effective or even feasible. In this case, the camera sensors 110a-b may be configured to serve the roles of the calibration devices 109a-b in diagram 200a. Specifically, the camera sensors 110a-b may be configured to shift focus from the surroundings of the vehicle 105 to the calibration target 115 from time to time, or the camera sensors 110a-b may be positioned such that the calibration target 115 is constantly within the imaging range of the camera sensors. In this way, imaging data of the calibration target 115 captured by the camera sensors 110a-b may be used to determine the distances 122, 123 and thus infer the distance between the camera sensors 110a-b, in a similar manner as described by diagram 200b.

Figure 2D:
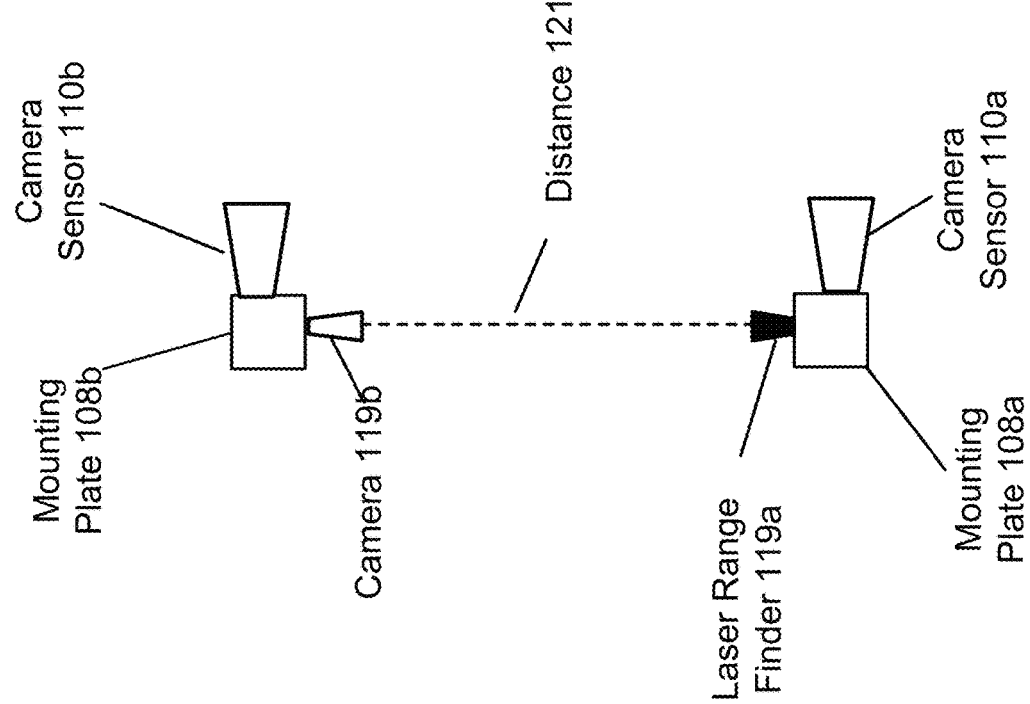
FIG. 2D is a block diagram illustrating an example configuration of continuous calibration using a secondary device accompanying each camera sensor of the stereo pair shown in FIG. 2A, according to an embodiment of the present technology.

FIG. 2D is a block diagram 200d illustrating an example configuration of continuous calibration using a secondary device 119a or 119b accompanying each camera sensor 110a or 110b of the stereo pair shown in FIG. 2A, according to an embodiment of the present technology. Unlike the calibration device 109a or 109b shown in FIGS. 2A-2B, which are rigidly fixed on to the mounting plate 108a or 108b facing towards the calibration target 115 on the hood of the vehicle 105, the secondary devices 119a and 119b are rigidly mounted on the mounting plate 108a and 108b facing towards each other. Specifically, one of the secondary devices, e.g., 119b, may be a camera such as a Siamese camera, while the other secondary device 119a may be a laser range finder.

As the secondary devices 119a-b are positioned facing each other, the secondary device 119a which may be a laser range finder may be configured to emit a laser beam, which may bounce off from the secondary device 119b such that the distance 121 may be estimated based on the round-trip transmission time of the laser beam.

On the other hand, the secondary device 119a which can be a laser range finder, while emitting a laser beam with shining visual effect, may serve as a bright spot target which the secondary device 119b which may be a Siamese camera may capture an image of. Thus, by imaging the bright spot from the secondary device 119a, the secondary device 119b may determine a relative distance 121 to the bright spot target. Thus, the estimated distances 121 via different estimation by the calibration devices 119a-b may be taken an average value for calibration.

FIG. 3A is a block diagram 300a illustrating an example overview of a vehicle equipped with a constellation of detached sensing modules that are continuously calibrated with a calibration target, according to an embodiment of the present technology. Block diagram 300a shows that a constellation of sensing modules placed around the top of the vehicle 105, with a calibration target 115 placed in the center. Specifically, each sensing module may include a mounting plate (similar to 108a-b shown in FIG. 2A), on which a (primary) sensor 110a-c and an (optional) calibration device 109a-c are rigidly mounted, respectively. Within each sensing module, the relative position between primary sensor 110a-c and the calibration device 109a-d remains unchanged, respectively.

In one implementation, the primary sensor 110a-c may be oriented outwardly towards the surroundings of the vehicle 105, while the calibration devices 109a-c may be oriented towards the calibration target 115 in the center such that the calibration devices 109a-c may use the calibration target 115 to calibrate the relative positions among the sensing modules (and thus among the primary sensors 110a-c).

Figure 3B:
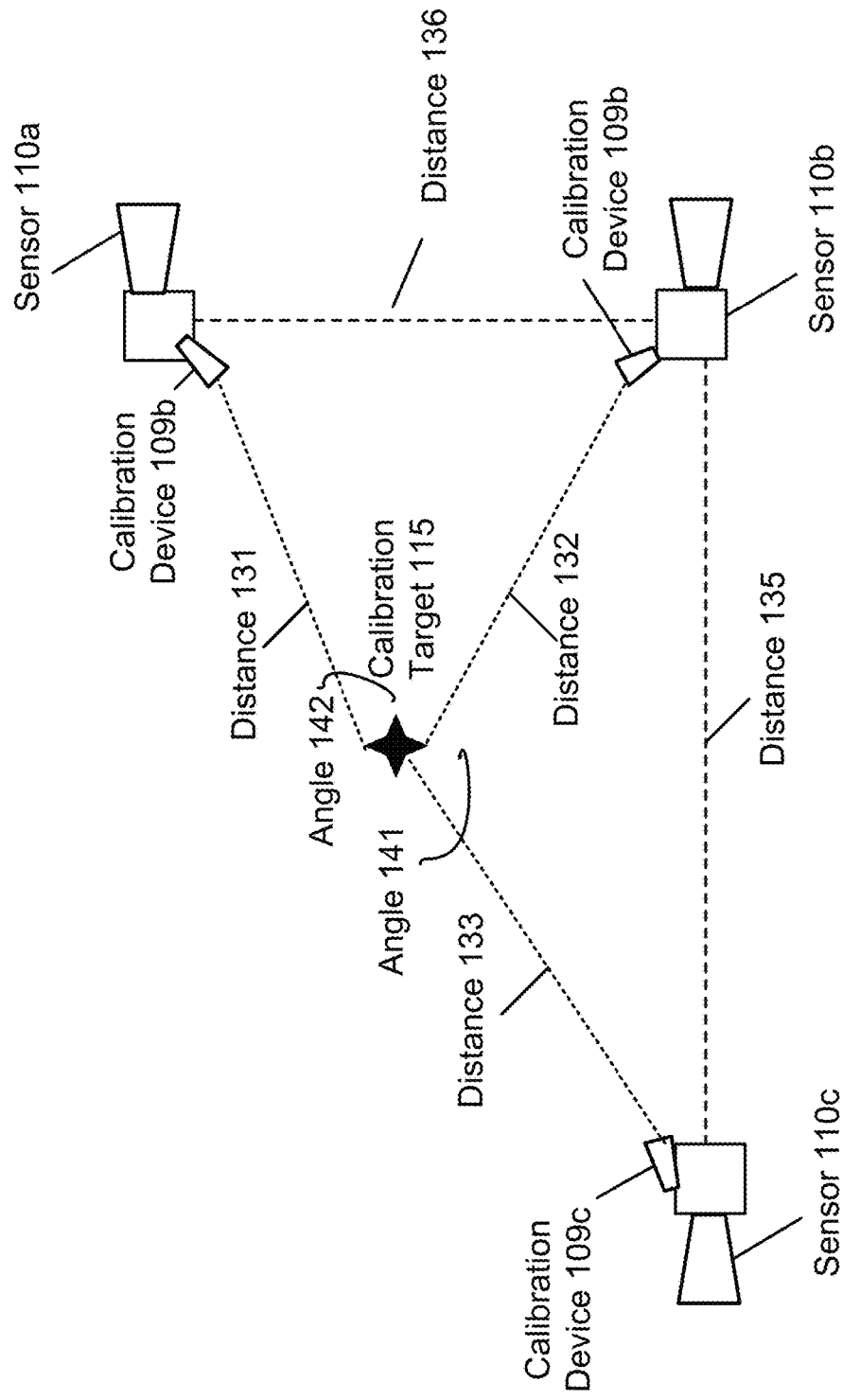
FIG. 3B is a block diagram illustrating an enlarged view of the constellation of multiple cameras or other sensors placed on the vehicle shown in FIG. 3A, according to an embodiment of the present technology.

FIG. 3B is a block diagram 300b illustrating an enlarged view of the constellation of multiple cameras or other sensors placed on the vehicle shown in FIG. 3A, according to an embodiment of the present technology. Diagram 300b shows an arrangement of objects, which may be placed at the top of vehicle 105. For example, the arrangement of objects includes an array of sensors 110a-c, each of which is rigidly fixed on a mounting plate (e.g., similar to 108a-b shown in FIG. 1) mounted on the top of the vehicle 105. The sensors 110a-c may be a camera sensor, a video camera, a radar, a lidar, a laser range finder, a thermal infrared imaging system, and/or the like, that is facing outwardly to capture visuals of the surrounding of the vehicle 105.

Each sensor 110a-c may be accompanied with a calibration device 109a-c. The calibration device 109a-c is each rigidly fixed on the mounting plate such that the relative position between the calibration device and the respective sensor on the same mounting plate remain unchanged. The calibration device 109a-c may be pre-configured to face towards a calibration target 115, which may be placed at the center of the top of the vehicle. The calibration device 109a-c may be any combination of a Siamese camera, a laser range finder, or any other imaging or sensing device that is capable of estimating a distance (e.g., distances 131, 132, 133) and/or relative position (e.g., angles 141, 142, etc.) between the calibration target 115 and the respective calibration device.

Thus, the distances 131, 132 and 133, and the angles 141, 142, may be used to compute a distance 135 and distance 136, e.g., via triangulation. The distances and/or relative positions between the sensors 110a-c can thus be calibrated.

It is noted that although three sensors 110a-c are shown in the calibration configuration of diagrams 300a-b, multiple (e.g., four, five, six and more) sensors may be placed in a circular manner with the calibration target 115 in the center. The multiple sensors may be calibrated in a similar manner using a calibration device accompanying each sensor.

FIG. 4 is a block diagram 400 illustrating an example overview of a vehicle equipped with different clusters of detached sensing modules calibrated with different calibration targets, according to an embodiment of the present technology. Block diagram 400 shows various sensing modules may be placed at different locations of the vehicle 105. For example, sensing module 120a which may be placed on the top of the vehicle 105, sensing module 120b placed on the A-pillar of the vehicle 105, and sensing module 120c placed on the hood of the vehicle 105 may all have a respective calibration device oriented towards the calibration target 115a. The calibration target 115a is located within an overlapping area of the fields of view of the calibration devices of sensing modules 120a-c.

For another example, sensing module 125a which may be placed on the top of the vehicle 105, sensing module 125b placed on the C-pillar of the vehicle 105, and sensing module 125c placed on the trunk of the vehicle 105 may all have a respective calibration device oriented towards the calibration target 115b placed on the trunk of the vehicle 105. The calibration target 115b is located within an overlapping area of the fields of view of the calibration devices of sensing modules 125a-c.

Thus, in this way, sensors may be placed at different locations on the vehicle 105 and may be grouped into clusters for calibration with a calibration target on the vehicle as long as the sensors grouped in the same cluster have overlapping fields of view.

Figure 5B:
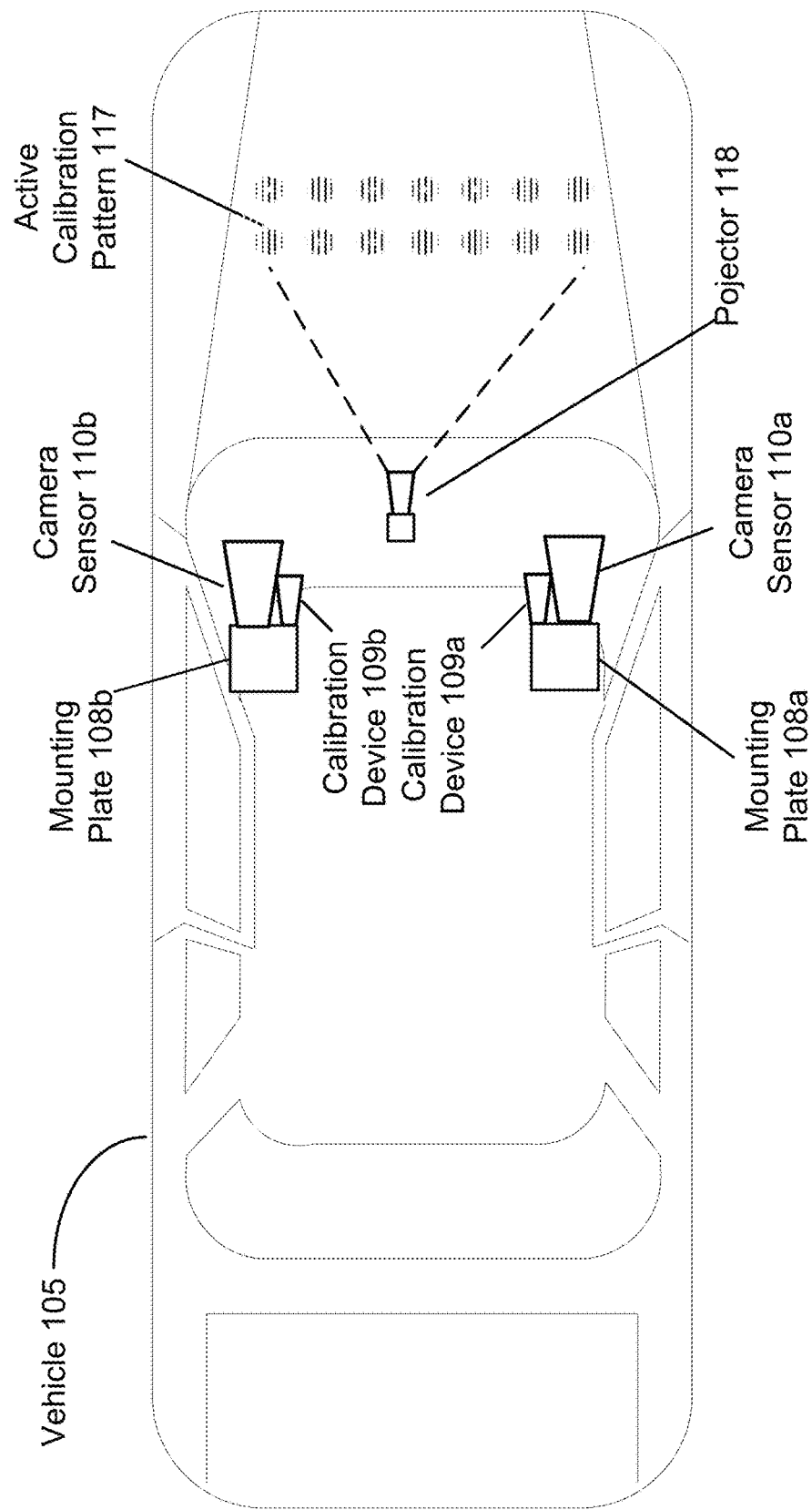
FIG. 5B is a block diagram illustrating an example overview of a vehicle equipped detached sensing modules that are calibrated with a projective active calibration pattern, according to an embodiment of the present technology.

FIGS. 5A-5B provide examples showing alternative shapes or types of the calibration target. FIG. 5A is a block diagram 500a illustrating an example overview of a vehicle equipped detached sensing modules that are continuously calibrated with a calibration stripe, according to an embodiment of the present technology. Block diagram 500a shows that the calibration target 116 may be a passive calibration pattern, e.g., in the shape of a stripe on the hood of the vehicle 105. For example, the calibration target stripe 116 may be a removable passive calibration pattern display that is pasted on the hood of vehicle 105. For another example, the calibration target stripe 116 may be painted on the hood of vehicle 105 using an invisible paint that is visible or detectable by the calibration device 109a-b. In some implementations, the calibration stripe may include a pre-defined shape or pattern, or orthogonal code for calibration. In this way, each sensing module of the camera sensor 110a (or 110b), the calibration device 109a (or 109b) and the mounting plate 108a (or 108b) may calibrate it respective position against other sensing module using the calibration target stripe 116.

FIG. 5B is a block diagram 500b illustrating an example overview of a vehicle equipped detached sensing modules that are continuously calibrated with a projective active calibration pattern, according to an embodiment of the present technology. Block diagram 200c shows that a projector 118 may be installed on the vehicle 105, e.g., at the front window or within the front window, to project an active calibration pattern 117 onto the hood of the vehicle.

In one implementation, the projector 118 may be communicative coupled to the computing system (e.g., 1000 in FIG. 10) of the vehicle 105. The computing system may then determine an active calibration pattern 117 for the projector 118 to project, based on which the computing system may calibrate the camera sensors 110a-b.

Figure 6:
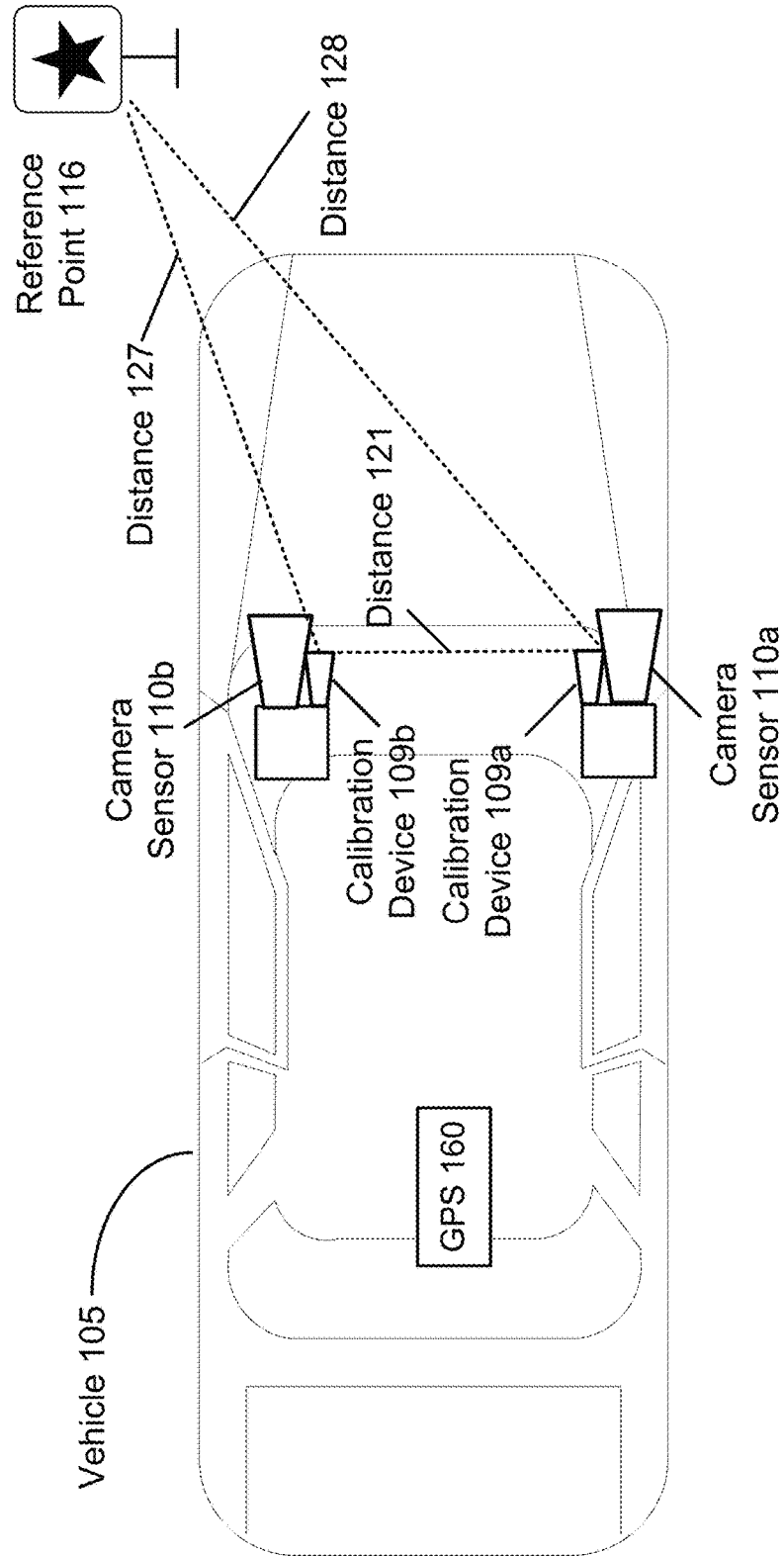
FIG. 6 is a block diagram illustrating an example configuration of calibration using a reference point in the field, according to an embodiment of the present technology.

FIG. 6 is a block diagram 600 illustrating an example configuration of continuous calibration using a reference point in the field, according to an embodiment of the present technology. Diagram 500 shows that a known reference point 166 in the field may be used as a calibration target. For example, the vehicle 105 may be equipped with a global positioning system (GPS) 160 which may provide location data to the computing system of the vehicle 105. The GPS information corresponding to a calibration spot near the known reference point 116 may be pre-stored with the vehicle 105. When the vehicle 105 arrives at the calibration spot according to the GPS coordinates captured by the GPS 160, the known reference point 116 may be within the overlapping area of the fields of view of both the calibration devices 109a-b. Then, once the calibration devices 109a-b generates imaging or sensing data of the reference point 116, which can be used to infer the distances 127 and 128 to the reference 116, the distance 121 between the calibration devices may be computed via triangulation in a similar manner as described in FIG. 2B.

In one embodiment, the reference point 116 may be a physical object in the field, such as a physical display of printed (passive) calibration pattern, etc. In another embodiment, the reference point 116 may be a digital display of active calibration pattern, which may vary the calibration pattern to generate different calibration data. In another embodiment, the reference point 116 may be a white display board such that the vehicle 105, e.g., via a projector equipped at the top of the vehicle. In this may project an active calibration pattern onto the reference point 116 way, the vehicle 105 may change the projected calibration pattern to obtain different imaging data for calibration.

Figure 7:
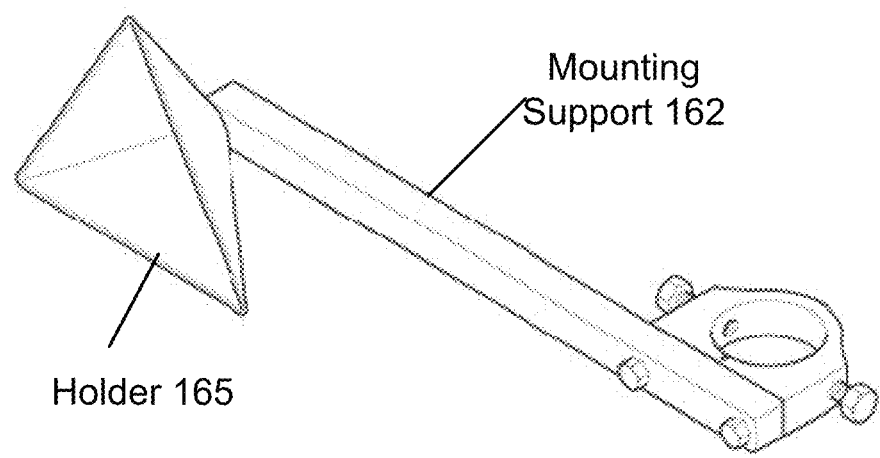
FIG. 7 is a block diagram illustrating an example configuration of a mounting device used to hold a camera sensor on a vehicle as shown in FIG. 2A, according to an embodiment of the present technology.

FIG. 7 is a block diagram illustrating an example configuration of a mounting device 108a or 108b used to hold a camera sensor 110a or 110b on a vehicle as shown in FIG. 2A, according to an embodiment of the present technology. The mounting device may include a mounting support 162 such as a rigid stem structure to support a holder 165 at one end of the stem, while the other end of the mounting support 162 may be fixed on the top of the vehicle 105. The holder 165 may serve as a mounting plate such that the camera sensor (e.g., 110a-b) can be fixed thereon.

It is noted that although FIG. 7 shows the mounting support 162 hosts one holder 165, another holder may be fixed on the mounting support 162 next to holder 165 in a similar manner. The other holder may then serve as a mounting plate for a secondary calibration device (e.g., 109a-b).

Figure 8:
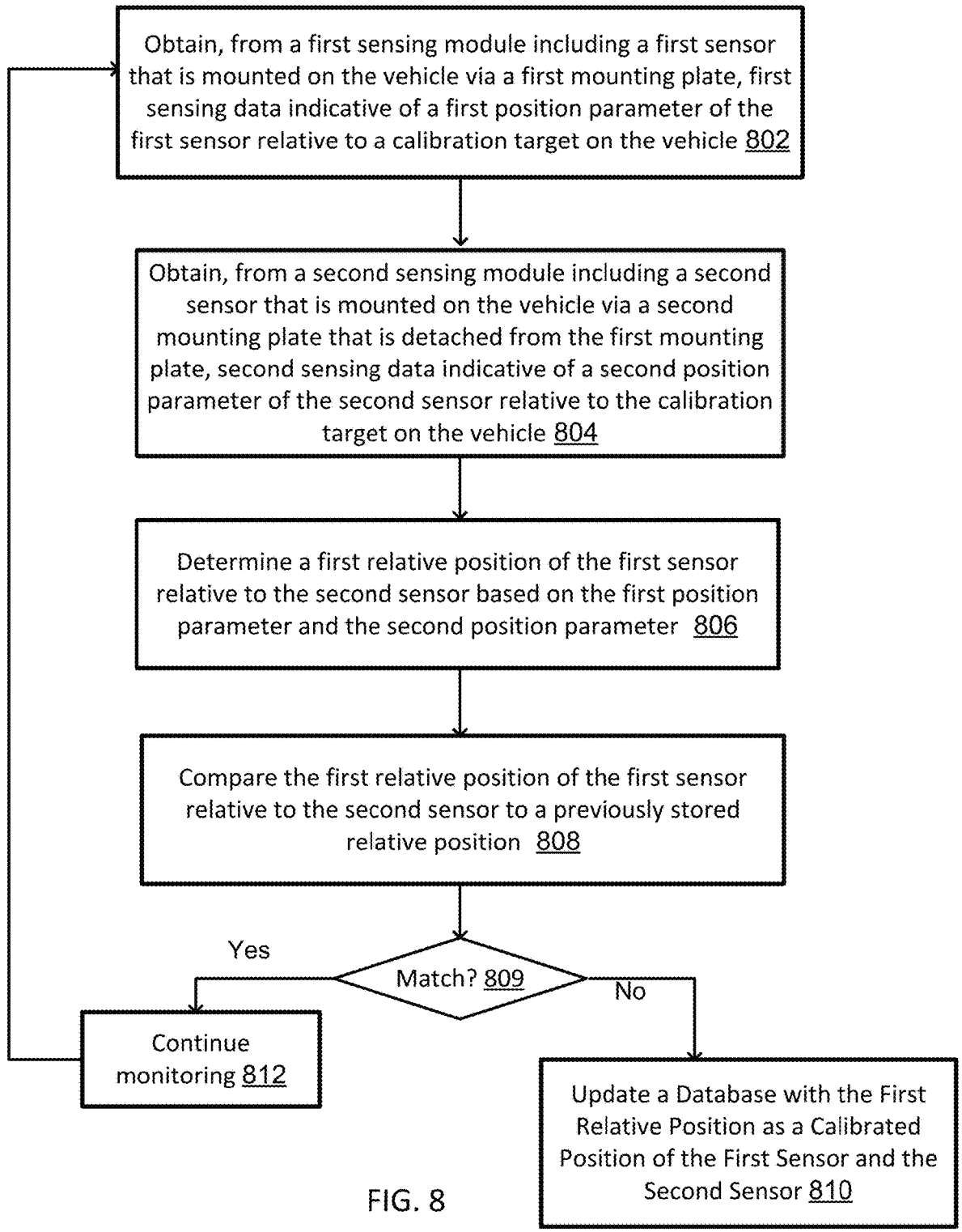
FIG. 8 is an example logic flow diagram illustrating the process of calibrating a camera sensor pair placed on the vehicle when the vehicle is in motion or in use, according to an embodiment of the present technology.

FIG. 8 is an example logic flow diagram illustrating the process 800 of continuously calibrating a camera sensor pair 110a-b placed on the vehicle 105 when the vehicle 105 is in motion or in use, according to an embodiment of the present technology. Process 800 may be performed by a computing system 1000 shown in FIG. 10 based on imaging or sensing data captured by any of the components such as calibration device 109a-b, camera sensor 110a-b shown in FIG. 2A.

At step 802, first sensing data indicative of a first position parameter of the first sensor relative to a calibration target on the vehicle is obtained, from a first sensing module including the first sensor that is mounted on the vehicle via a first mounting plate. For example, as shown in FIG. 3A, the calibration device 109a obtains imaging data indicative of a relative position of the calibration target 115, e.g., distance 123.

At step 804, second sensing data indicative of a second position parameter of the second sensor relative to the calibration target on the vehicle is obtained, from the second sensing module including a second sensor that is mounted on the vehicle via a second mounting plate that is detached from the first mounting plate. For example, the calibration device 109b obtains imaging data indicative of a relative position of the calibration target 115, e.g., distance 122.

In some implementations, the first sensing data or the second sensing data may include a measurement indicating a distance between the calibration target and the first sensor or the second sensor, e.g., a laser roundtrip time measurement when the calibration device is a laser range finder. In some implementations, the first sensing data or the second sensing data may include imaging data depicting a size or a shape of the calibration target from a point of view at the first sensor or the second sensor, e.g., when first or second sensor is a "Siamese" camera.

At step 806, a first relative position of the first sensor relative to the second sensor is determined based on the first position parameter and the second position parameter. For example, a processor of the vehicle 105 receives the imaging or sensing data captured by the calibration devices 109a-b, based on which the distance 122 and distance 123 can be inferred. In some implementations, the angle 124 shown in FIG. 2 illustrating the relative orientations of the calibration device 109a-b relative to the calibration target 115 can also be obtained from the imaging data. The processor of the vehicle 105 further determines distance 121 based on the distances 122, 123, and the angle 124, e.g., via triangulation.

In some implementations, when the calibration target is a projected active calibration pattern (e.g., 117 in FIG. 2C), the processor of the vehicle 105 may retrieve a pattern parameter relating to the active calibration pattern; and determine the first relative position of the first sensor relative to the second sensor from the first sensing data and the second sensing data based at least in part on the pattern parameter.

At step 808, the first relative position of the first sensor relative to the second sensor is then compared to a previously stored relative position. For example, the previously stored relative position may be retrieved from a lookup table in the memory of the computing system 1000 in FIG. 10.

At step 809, if the determined first relative position matches with the previously stored relative position (or within a threshold range of deviation), method 800 proceeds to step 812, where the system continues monitoring the relative position of the camera sensors, and method 800 may repeat at 802.

At step 809, if the determined first relative position does not match with the previously stored relative position (e.g., exceeds a threshold range of deviation), method 800 proceeds to step 810, at which the processor of the vehicle 105 may update a database with the determined first relative position as a calibrated position parameter associated with the first sensor and the second sensor. The processor may also (optionally) send a command to request re-calibration of the cameras based on the determined first relative position.

Process 800 may be continuously, constantly, intermittently, periodically, or otherwise performed on demand when the vehicle 105 is in motion. In this way, the computing system of the vehicle 105 can keep an accurate record of the constantly calibrated distance of the camera sensor 110*a-b*, and or other sensors.

Figure 9:
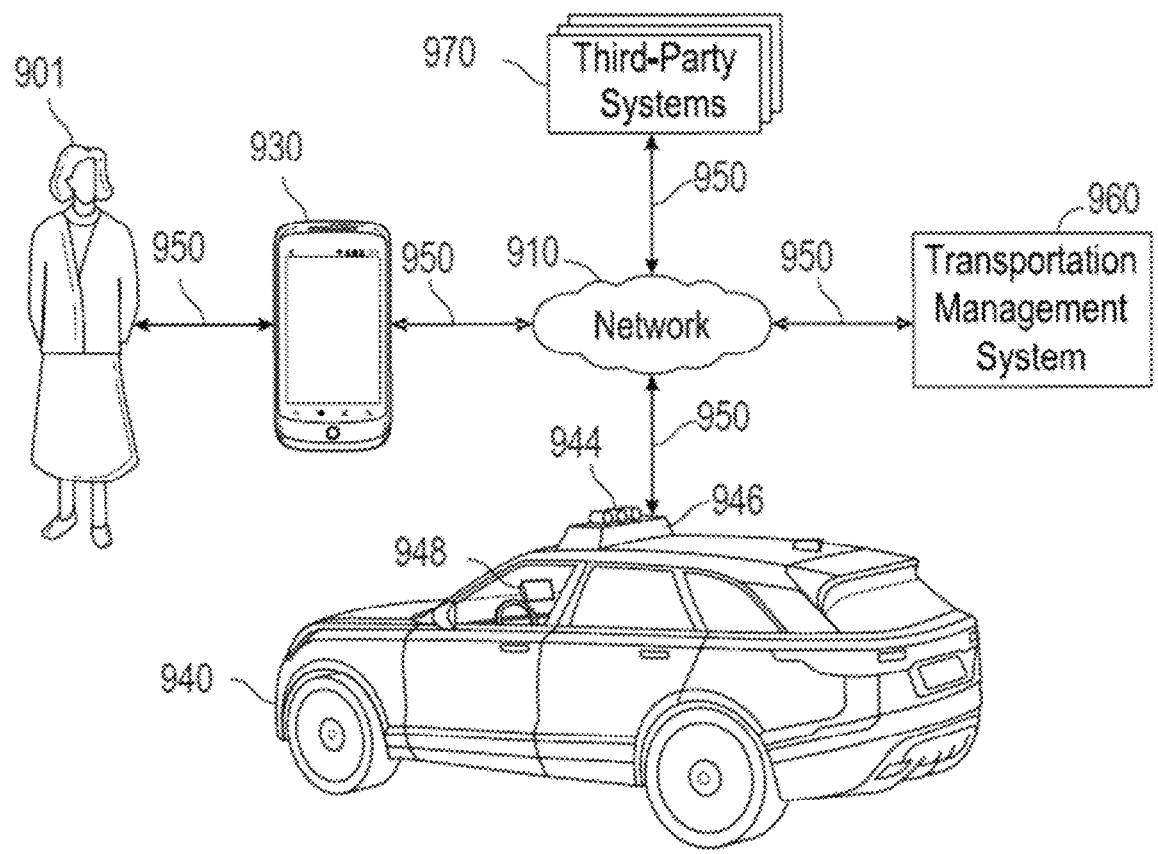
FIG. 9 illustrates an example block diagram of a transportation management environment involving the vehicle shown in FIG. 2A, according to an embodiment of the present technology.

FIG. 9 illustrates an example block diagram of a transportation management environment involving the vehicle 105 shown in FIGS. 2A-2E, according to an embodiment of the present technology. In particular embodiments, the environment may include various computing entities, such as a user computing device 930 of a user 901 (e.g., a ride provider or requestor), a transportation management system 960, a vehicle 940, and one or more third-party systems 970. The vehicle 940, which may be similar to the vehicle 105 in FIGS. 2A-2E, can be autonomous, semi-autonomous, or manually drivable. The computing entities may be communicatively connected over any suitable network 910. As an example and not by way of limitation, one or more portions of network 910 may include an ad hoc network, an extranet, a virtual private network (VPN), a local area network (LAN), a wireless LAN (WLAN), a wide area network (WAN), a wireless WAN (WWAN), a metropolitan area network (MAN), a portion of the Internet, a portion of Public Switched Telephone Network (PSTN), a cellular network, or a combination of any of the above. In particular embodiments, any suitable network arrangement and protocol enabling the computing entities to communicate with each other may be used. Although FIG. 9 illustrates a single user device 930, a single transportation management system 960, a single vehicle 940, a plurality of third-party systems 970, and a single network 910, this disclosure contemplates any suitable number of each of these entities. As an example and not by way of limitation, the network environment may include multiple users 901, user devices 930, transportation management systems 960, vehicles 940, third-party systems 970, and networks 910. In some embodiments, some or all of the modules or devices shown in FIGS. 1-7 may be implemented, controlled by, or otherwise communicate with one or more computing systems of the transportation management system 960.

The user device 930, transportation management system 960, vehicle 940, and third-party system 970 may be communicatively connected or co-located with each other in whole or in part. These computing entities may communicate via different transmission technologies and network types. For example, the user device 930 and the vehicle 940 may communicate with each other via a cable or short-range wireless communication (e.g., Bluetooth, NFC, WI-FI, etc.), and together they may be connected to the Internet via a cellular network that is accessible to either one of the devices (e.g., the user device 930 may be a smartphone with LTE connection). The transportation management system 960 and third-party system 970, on the other hand, may be connected to the Internet via their respective LAN/WLAN networks and Internet Service Providers (ISP). FIG. 9 illustrates transmission links 950 that connect user device 930, vehicle 940, transportation management system 960, and third-party system 970 to communication network 910. This disclosure contemplates any suitable transmission links 950, including, e.g., wire connections (e.g., USB, Lightning, Digital Subscriber Line (DSL) or Data Over Cable Service Interface Specification (DOCSIS)), wireless connections (e.g., WI-FI, WiMAX, cellular, satellite, NFC, Bluetooth), optical connections (e.g., Synchronous Optical Networking (SONET), Synchronous Digital Hierarchy (SDH)), any other wireless communication technologies, and any combination thereof. In particular embodiments, one or more links 950 may connect to one or more networks 910, which may include in part, e.g., ad-hoc network, the Intranet, extranet, VPN, LAN, WLAN, WAN, WWAN, MAN, PSTN, a cellular network, a satellite network, or any combination thereof. The computing entities need not necessarily use the same type of transmission link 950. For example, the user device 930 may communicate with the transportation management system via a cellular network and the Internet, but communicate with the vehicle 940 via Bluetooth or a physical wire connection.

In particular embodiments, the transportation management system 960 may fulfill ride requests for one or more users 901 by dispatching suitable vehicles. The transportation management system 960 may receive any number of ride requests from any number of ride requestors 901. In particular embodiments, a ride request from a ride requestor 901 may include an identifier that identifies the ride requestor in the system 960. The transportation management system 960 may use the identifier to access and store the ride requestor's 901 information, in accordance with the requestor's 901 privacy settings. The ride requestor's 901 information may be stored in one or more data stores (e.g., a relational database system) associated with and accessible to the transportation management system 960. In particular embodiments, ride requestor information may include profile information about a particular ride requestor 901. In particular embodiments, the ride requestor 901 may be associated with one or more categories or types, through which the ride requestor 901 may be associated with aggregate information about certain ride requestors of those categories or types. Ride information may include, for example, preferred pick-up and drop-off locations, driving preferences (e.g., safety comfort level, preferred speed, rates of acceleration/deceleration, safety distance from other vehicles when travelling at various speeds, route, etc.), entertainment preferences and settings (e.g., preferred music genre or playlist, audio volume, display brightness, etc.), temperature settings, whether conversation with the driver is welcomed, frequent destinations, historical riding patterns (e.g., time of day of travel, starting and ending locations, etc.), preferred language, age, gender, or any other suitable information. In particular embodiments, the transportation management system 960 may classify a user 901 based on known information about the user 901 (e.g., using machine-learning classifiers), and use the classification to retrieve relevant aggregate information associated with that class. For example, the system 960 may classify a user 901 as a young adult and retrieve relevant aggregate information associated with young adults, such as the type of music generally preferred by young adults.

Transportation management system 960 may also store and access ride information. Ride information may include locations related to the ride, traffic data, route options, optimal pick-up or drop-off locations for the ride, or any other suitable information associated with a ride. As an example and not by way of limitation, when the transportation management system 960 receives a request to travel from San Francisco International Airport (SFO) to Palo Alto, California, the system 960 may access or generate any relevant ride information for this particular ride request. The ride information may include, for example, preferred pick-up locations at SFO; alternate pick-up locations in the event that a pick-up location is incompatible with the ride requestor (e.g., the ride requestor may be disabled and cannot access the pick-up location) or the pick-up location is otherwise unavailable due to construction, traffic congestion, changes in pick-up/drop-off rules, or any other reason; one or more routes to navigate from SFO to Palo Alto; preferred off-ramps for a type of user; or any other suitable information associated with the ride. In particular embodiments, portions of the ride information may be based on historical data associated with historical rides facilitated by the system 960. For example, historical data may include aggregate information generated based on past ride information, which may include any ride information described herein and telemetry data collected by sensors in vehicles and user devices. Historical data may be associated with a particular user (e.g., that particular user's preferences, common routes, etc.), a category/class of users (e.g., based on demographics), and all users of the system 960. For example, historical data specific to a single user may include information about past rides that particular user has taken, including the locations at which the user is picked up and dropped off, music the user likes to listen to, traffic information associated with the rides, time of the day the user most often rides, and any other suitable information specific to the user. As another example, historical data associated with a category/class of users may include, e.g., common or popular ride preferences of users in that category/class, such as teenagers preferring pop music, ride requestors who frequently commute to the financial district may prefer to listen to the news, etc. As yet another example, historical data associated with all users may include general usage trends, such as traffic and ride patterns. Using historical data, the system 960 in particular embodiments may predict and provide ride suggestions in response to a ride request. In particular embodiments, the system 960 may use machine-learning, such as neural networks, regression algorithms, instance-based algorithms (e.g., k-Nearest Neighbor), decision-tree algorithms, Bayesian algorithms, clustering algorithms, association-rule-learning algorithms, deep-learning algorithms, dimensionality-reduction algorithms, ensemble algorithms, and any other suitable machine-learning algorithms known to persons of ordinary skill in the art. The machine-learning models may be trained using any suitable training algorithm, including supervised learning based on labeled training data, unsupervised learning based on unlabeled training data, and semi-supervised learning based on a mixture of labeled and unlabeled training data.

In particular embodiments, transportation management system 960 may include one or more server computers. Each server may be a unitary server or a distributed server spanning multiple computers or multiple datacenters. The servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, transportation management system 960 may include one or more data stores. The data stores may be used to store various types of information, such as ride information, ride requestor information, ride provider information, historical information, third-party information, or any other suitable type of information. In particular embodiments, the information stored in the data stores may be organized according to specific data structures. In particular embodiments, each data store may be a relational, columnar, correlation, or any other suitable type of database system. Although this disclosure describes or illustrates particular types of databases, this disclosure contemplates any suitable types of databases. Particular embodiments may provide interfaces that enable a user device 930 (which may belong to a ride requestor or provider), a transportation management system 960, vehicle system 940, or a third-party system 970 to process, transform, manage, retrieve, modify, add, or delete the information stored in the data store.

In particular embodiments, transportation management system 960 may include an authorization server (or any other suitable component(s)) that allows users 901 to opt-in to or opt-out of having their information and actions logged, recorded, or sensed by transportation management system 960 or shared with other systems (e.g., third-party systems 970). In particular embodiments, a user 901 may opt-in or opt-out by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users 901 of transportation management system 960 through blocking, data hashing, anonymization, or other suitable techniques as appropriate.

In particular embodiments, third-party system 970 may be a network-addressable computing system that may provide HD maps or host GPS maps, customer reviews, music or content, weather information, or any other suitable type of information. Third-party system 970 may generate, store, receive, and send relevant data, such as, for example, map data, customer review data from a customer review website, weather data, or any other suitable type of data. Third-party system 970 may be accessed by the other computing entities of the network environment either directly or via network 910. For example, user device 930 may access the third-party system 970 via network 910, or via transportation management system 960. In the latter case, if credentials are required to access the third-party system 970, the user 901 may provide such information to the transportation management system 960, which may serve as a proxy for accessing content from the third-party system 970.

In particular embodiments, user device 930 may be a mobile computing device such as a smartphone, tablet computer, or laptop computer. User device 930 may include one or more processors (e.g., CPU, GPU), memory, and storage. An operating system and applications may be installed on the user device 930, such as, e.g., a transportation application associated with the transportation management system 960, applications associated with third-party systems 970, and applications associated with the operating system. User device 930 may include functionality for determining its location, direction, or orientation, based on integrated sensors such as GPS, compass, gyroscope, or accelerometer. User device 930 may also include wireless transceivers for wireless communication and may support wireless communication protocols such as Bluetooth, near-field communication (NFC), infrared (IR) communication, WI-FI, and 2G/3G/4G/LTE/5G mobile communication standard. User device 930 may also include one or more cameras, scanners, touchscreens, microphones, speakers, and any other suitable input-output devices.

In particular embodiments, the vehicle 940 may be equipped with an array of sensors 944, a navigation system 946, and a ride-service computing device 948. In particular embodiments, a fleet of vehicles 940 may be managed by the transportation management system 960. The fleet of vehicles 940, in whole or in part, may be owned by the entity associated with the transportation management system 960, or they may be owned by a third-party entity relative to the transportation management system 960. In either case, the transportation management system 960 may control the operations of the vehicles 940, including, e.g., dispatching select vehicles 940 to fulfill ride requests, instructing the vehicles 940 to perform select operations (e.g., head to a service center or charging/fueling station, pull over, stop immediately, self-diagnose, lock/unlock compartments, change music station, change temperature, and any other suitable operations), and instructing the vehicles 940 to enter select operation modes (e.g., operate normally, drive at a reduced speed, drive under the command of human operators, and any other suitable operational modes).

In particular embodiments, the vehicles 940 may receive data from and transmit data to the transportation management system 960 and the third-party system 970. Examples of received data may include, e.g., instructions, new software or software updates, maps, 3D models, trained or untrained machine-learning models, location information (e.g., location of the ride requestor, the vehicle 940 itself, other vehicles 940, and target destinations such as service centers), navigation information, traffic information, weather information, entertainment content (e.g., music, video, and news) ride requestor information, ride information, and any other suitable information. Examples of data transmitted from the vehicle 940 may include, e.g., telemetry and sensor data, determinations/decisions based on such data, vehicle condition or state (e.g., battery/fuel level, tire and brake conditions, sensor condition, speed, odometer, etc.), location, navigation data, passenger inputs (e.g., through a user interface in the vehicle 940, passengers may send/receive data to the transportation management system 960 and third-party system 970), and any other suitable data.

In particular embodiments, vehicles 940 may also communicate with each other, including those managed and not managed by the transportation management system 960. For example, one vehicle 940 may communicate with another vehicle data regarding their respective location, condition, status, sensor reading, and any other suitable information. In particular embodiments, vehicle-to-vehicle communication may take place over direct short-range wireless connection (e.g., WI-FI, Bluetooth, NFC) or over a network (e.g., the Internet or via the transportation management system 960 or third-party system 970), or both.

In particular embodiments, a vehicle 940 may obtain and process sensor/telemetry data. Such data may be captured by any suitable sensors. For example, the vehicle 940 may have a Light Detection and Ranging (LiDAR) sensor array of multiple LiDAR transceivers that are configured to rotate 360°, emitting pulsed laser light and measuring the reflected light from objects surrounding vehicle 940. In particular embodiments, LiDAR transmitting signals may be steered by use of a gated light valve, which may be a MEMs device that directs a light beam using the principle of light diffraction. Such a device may not use a gimbaled mirror to steer light beams in 360° around the vehicle. Rather, the gated light valve may direct the light beam into one of several optical fibers, which may be arranged such that the light beam may be directed to many discrete positions around the vehicle. Thus, data may be captured in 360° around the vehicle, but no rotating parts may be necessary. A LiDAR is an effective sensor for measuring distances to targets, and as such may be used to generate a three-dimensional (3D) model of the external environment of the vehicle 940. As an example and not by way of limitation, the 3D model may represent the external environment including objects such as other cars, curbs, debris, objects, and pedestrians up to a maximum range of the sensor arrangement (e.g., 50, 100, or 200 meters). As another example, the vehicle 940 may have optical cameras pointing in different directions. The cameras may be used for, e.g., recognizing roads, lane markings, street signs, traffic lights, police, other vehicles, and any other visible objects of interest. To enable the vehicle 940 to "see" at night, infrared cameras may be installed. In particular embodiments, the vehicle may be equipped with stereo vision for, e.g., spotting hazards such as pedestrians or tree branches on the road. As another example, the vehicle 940 may have radars for, e.g., detecting other vehicles and hazards afar. Furthermore, the vehicle 940 may have ultrasound equipment for, e.g., parking and obstacle detection. In addition to sensors enabling the vehicle 940 to detect, measure, and understand the external world around it, the vehicle 940 may further be equipped with sensors for detecting and self-diagnosing the vehicle's own state and condition. For example, the vehicle 940 may have wheel sensors for, e.g., measuring velocity; global positioning system (GPS) for, e.g., determining the vehicle's current geolocation; and inertial measurement units, accelerometers, gyroscopes, and odometer systems for movement or motion detection. While the description of these sensors provides particular examples of utility, one of ordinary skill in the art would appreciate that the utilities of the sensors are not limited to those examples. Further, while an example of a utility may be described with respect to a particular type of sensor, it should be appreciated that the utility may be achieved using any combination of sensors. For example, the vehicle 940 may build a 3D model of its surrounding based on data from its LiDAR, radar, sonar, and cameras, along with a pre-generated map obtained from the transportation management system 960 or the third-party system 970. Although sensors 944 appear in a particular location on the vehicle 940 in FIG. 9, sensors 944 may be located in any suitable location in or on the vehicle 940. Example locations for sensors include the front and rear bumpers, the doors, the front windshield, on the side panel, or any other suitable location.

In particular embodiments, the vehicle 940 may be equipped with a processing unit (e.g., one or more CPUs and GPUs), memory, and storage. The vehicle 940 may thus be equipped to perform a variety of computational and processing tasks, including processing the sensor data, extracting useful information, and operating accordingly. For example, based on images captured by its cameras and a machine-vision model, the vehicle 940 may identify particular types of objects captured by the images, such as pedestrians, other vehicles, lanes, curbs, and any other objects of interest.

In particular embodiments, the vehicle 940 may have a navigation system 946 responsible for safely navigating the vehicle 940. In particular embodiments, the navigation system 946 may take as input any type of sensor data from, e.g., a Global Positioning System (GPS) module, inertial measurement unit (IMU), LiDAR sensors, optical cameras, radio frequency (RF) transceivers, or any other suitable telemetry or sensory mechanisms. The navigation system 946 may also utilize, e.g., map data, traffic data, accident reports, weather reports, instructions, target destinations, and any other suitable information to determine navigation routes and particular driving operations (e.g., slowing down, speeding up, stopping, swerving, etc.). In particular embodiments, the navigation system 946 may use its determinations to control the vehicle 940 to operate in prescribed manners and to guide the vehicle 940 to its destinations without colliding into other objects. Although the physical embodiment of the navigation system 946 (e.g., the processing unit) appears in a particular location on the vehicle 940 in FIG. 9, navigation system 946 may be located in any suitable location in or on the vehicle 940. Example locations for navigation system 946 include inside the cabin or passenger compartment of the vehicle 940, near the engine/battery, near the front seats, rear seats, or in any other suitable location.

In particular embodiments, the vehicle 940 may be equipped with a ride-service computing device 948, which may be a tablet or any other suitable device installed by transportation management system 960 to allow the user to interact with the vehicle 940, transportation management system 960, other users 901, or third-party systems 970. In particular embodiments, installation of ride-service computing device 948 may be accomplished by placing the ride-service computing device 948 inside the vehicle 940, and configuring it to communicate with the vehicle 940 via a wired or wireless connection (e.g., via Bluetooth). Although FIG. 9 illustrates a single ride-service computing device 948 at a particular location in the vehicle 940, the vehicle 940 may include several ride-service computing devices 948 in several different locations within the vehicle. As an example and not by way of limitation, the vehicle 940 may include four ride-service computing devices 948 located in the following places: one in front of the front-left passenger seat (e.g., driver's seat in traditional U.S. automobiles), one in front of the front-right passenger seat, one in front of each of the rear-left and rear-right passenger seats. In particular embodiments, ride-service computing device 948 may be detachable from any component of the vehicle 940. This may allow users to handle ride-service computing device 948 in a manner consistent with other tablet computing devices. As an example and not by way of limitation, a user may move ride-service computing device 948 to any location in the cabin or passenger compartment of the vehicle 940, may hold ride-service computing device 948, or handle ride-service computing device 948 in any other suitable manner. Although this disclosure describes providing a particular computing device in a particular manner, this disclosure contemplates providing any suitable computing device in any suitable manner.

Figure 10:
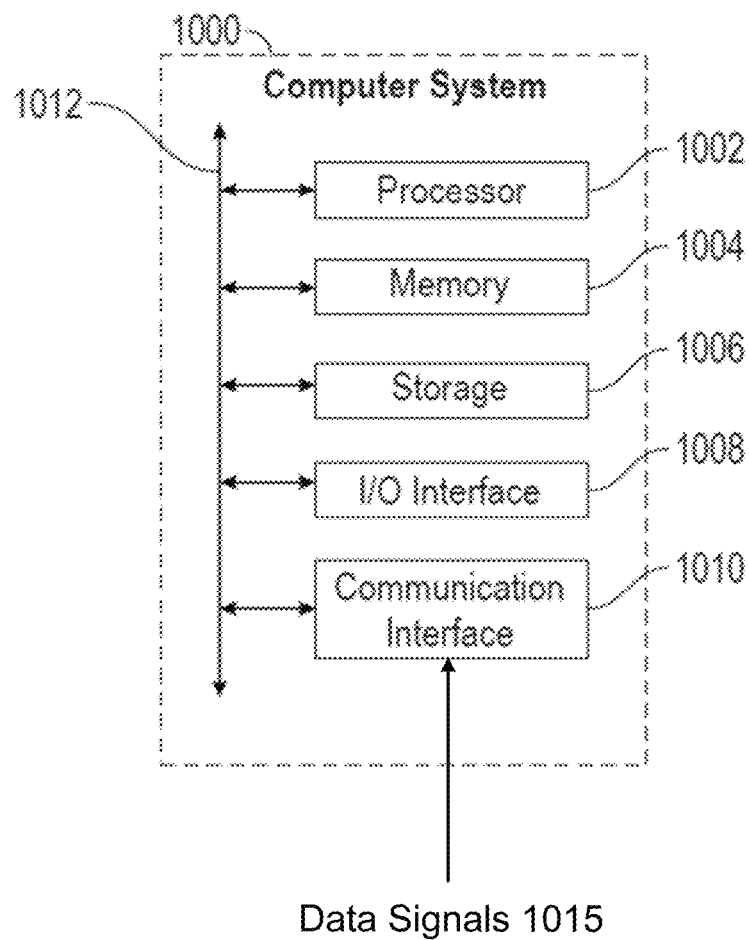
FIG. 10 illustrates an example of a computer system or computing device that can be utilized on the vehicle shown in FIG. 2A, according to an embodiment of the present technology.

FIG. 10 illustrates an example computer system 1000, which may be equipped at the vehicle 105 in FIGS. 2A-2E, or the vehicle 940 in FIG. 9. In particular embodiments, one or more computer systems 1000 perform one or more steps of one or more methods described or illustrated herein. In particular embodiments, one or more computer systems 1000 provide the functionalities described or illustrated herein. In particular embodiments, software running on one or more computer systems 1000 performs one or more steps of one or more methods described or illustrated herein or provides the functionalities described or illustrated herein. Particular embodiments include one or more portions of one or more computer systems 1000. Herein, a reference to a computer system may encompass a computing device, and vice versa, where appropriate. Moreover, a reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 that are to be operated on by computer instructions; the results of previous instructions executed by processor 1002 that are accessible to subsequent instructions or for writing to memory 1004 or storage 1006; or any other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs), be a multi-core processor, or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described in further detail below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware or software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware or software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

For example, the communication interface 1010 may be configured to receive data signals 1015 from calibration devices 109a-b. The data signals 1015 represent imaging or sensing data that the calibration devices 109a-b captured. For example, the data signals 1015 may convey a measurement indicating a distance between the calibration target and a calibration device, or imaging data depicting a size or a shape of the calibration target from a point of view at the calibration device. Communication interface 1010 may then transmit the data signals 1015 to the processor 1002, which may in turn perform method 800 based on the imaging or sensing data conveyed in the data signals 1015.

In particular embodiments, bus 1012 includes hardware or software, or both coupling components of computer system 1000 to each other. As an example and not by way of limitation, bus 1012 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A or B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Methods described herein may vary in accordance with the present disclosure. Various embodiments of this disclosure may repeat one or more steps of the methods described herein, where appropriate. Although this disclosure describes and illustrates particular steps of certain methods as occurring in a particular order, this disclosure contemplates any suitable steps of the methods occurring in any suitable order or in any combination which may include all, some, or none of the steps of the methods. Furthermore, although this disclosure may describe and illustrate particular components, devices, or systems carrying out particular steps of a method, this disclosure contemplates any suitable combination of any suitable components, devices, or systems carrying out any suitable steps of the method.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, modules, elements, feature, functions, operations, or steps, any of these embodiments may include any combination or permutation of any of the components, modules, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A system for calibration of a set of sensors on a vehicle, the system comprising:
   a first sensing module that is mounted on the vehicle via a first mounting plate on top of the vehicle,
      wherein the first sensing module includes a first calibration device and a first sensor of the set of sensors, wherein the first calibration device and the first sensor are fixed on the first mounting plate, and wherein the first calibration device is used to calibrate the first sensor;
   a second sensing module that is mounted on the vehicle via a second mounting plate that is on top of the vehicle and separate from the first mounting plate,
      wherein the second sensing module includes a second calibration device and a second sensor of the set of sensors, wherein the second calibration device and the second sensor are fixed on the second mounting plate, and wherein the second calibration device is used to calibrate the second sensor, and
      wherein the first calibration device and the second calibration device are each configured to generate respective sensing data indicative of a respective position parameter of the respective sensor relative to a calibration target; and
   a processor configured to receive the respective sensing data from the first calibration device and the second calibration device and determine a first relative position of the first sensor relative to the second sensor based on the respective position parameter of the calibration target.

2. The system of claim 1, wherein the first sensor is fixed on the first mounting plate, and a first relative position parameter of the first sensor on the first mounting plate is known to the system, and
wherein the second sensor is fixed on the second mounting plate, and a second relative position parameter of the second sensor on the second mounting plate is constant.

3. The system of claim 1, wherein the first sensor is a first camera sensor that is fixed on the first mounting plate, and
wherein a first relative position parameter between the first calibration device and the first camera sensor is known to the system.

4. The system of claim 3, wherein the second sensor is a second camera sensor that is fixed on the second mounting plate, and a second relative position parameter between the second calibration device and the second camera sensor is known to the system, and
wherein the respective sensing data generated by the first calibration device or the second calibration device is used to calibrate a second relative position between the first camera sensor and the second camera sensor.

5. The system of claim 1, wherein the calibration target comprises any of:
a feature of the vehicle;
a physical object positioned on the vehicle;
a passive calibration pattern placed on a surface of the vehicle; or
an active calibration pattern that is projected on a surface of the vehicle.

6. The system of claim 5, further comprising:
a projector on the vehicle configured to project the active calibration pattern onto the surface of the vehicle, and
wherein the processor is further configured to retrieve a pattern parameter relating to the active calibration pattern and determine the respective position parameter of the calibration target from the respective sensing data based at least in part on the pattern parameter.

7. The system of claim 1, wherein the first sensor has a first field of view and the second sensor has a second field of view, and wherein the calibration target is located within an overlapping area of the first field of view and the second field of view.

8. The system of claim 1, wherein the first sensor or the second sensor is any of:
a camera sensor;
a range imaging system;
a laser interferometer; or
a laser range finder.

9. The system of claim 1, further comprising:
a third sensing module that is mounted on the vehicle, wherein the third sensing module includes a third mounting plate that is detached from the first mounting plate and the second mounting plate, and carries a third sensor of the set of sensors, and
wherein the third sensor is configured to generate additional sensing data indicative of an additional position parameter of the third sensor relative to the calibration target, and
wherein the processor is further configured to determine an additional relative position of the first sensor or the second sensor relative to the third sensor based on the respective position parameter and the additional position parameter of the calibration target.

10. The system of claim 1, wherein the respective sensing data captured by the first calibration device or the second calibration device includes at least one of:
a measurement indicating a distance between the calibration target and the first sensor or the second sensor; or
imaging data depicting a size or a shape of the calibration target from a point of view at the first sensor or the second sensor.

11. A method for calibration of a set of sensors on a vehicle, the method comprising:
obtaining, from a first sensing module including a first calibration device and a first sensor that is mounted on the vehicle via a first mounting plate on top of the vehicle, first sensing data indicative of a first position parameter of the first sensor relative to a calibration target on the vehicle, wherein the first calibration device and the first sensor are fixed on the first mounting plate, and wherein the first calibration device is used to calibrate the first sensor;
obtaining, from a second sensing module including a second calibration device and a second sensor that is mounted on the vehicle via a second mounting plate on top of the vehicle, second sensing data indicative of a second position parameter of the second sensor relative to the calibration target on the vehicle, wherein the second calibration device and the second sensor are fixed on the second mounting plate,
wherein the second mounting plate is separate from the first mounting plate,
wherein the first sensing module is detached from the second sensing module; and
determining a relative position of the first sensor relative to the second sensor based on the first position parameter and the second position parameter.

12. The method of claim 11, wherein the first sensor is fixed on the first mounting plate, and a first relative position of the first sensor on the first mounting plate is constant, and
wherein the second sensor is fixed on the second mounting plate, and a second relative position of the second sensor on the second mounting plate is constant.

13. The method of claim 11, further comprising:
determining that the determined relative position is outside a threshold range of a previously stored relative position between the first sensor and the second sensor;
updating the previously stored relative position with the determined relative position; and
sending a command to re-calibrate the first sensor and the second sensor.

14. The method of claim 13, further comprising:
retrieving a pattern parameter relating to the calibration target; and
determining the relative position of the first sensor relative to the second sensor from the first sensing data and the second sensing data based at least in part on the pattern parameter.

15. The method of claim 11, wherein the first sensor has a first field of view and the second sensor has a second field of view, and wherein the calibration target is located within an overlapping area of the first field of view and the second field of view.

16. The method of claim 11, wherein the first sensor is a first camera sensor that is fixed on the first mounting plate, and the second sensor is a second camera sensor that is fixed on the second mounting plate, and the method further comprises:

calibrating a second relative position between the first camera sensor and the second camera sensor using the first sensing data generated by the first calibration device and the second sensing data generated by the second calibration device.

17. The method of claim 11, further comprising:
obtaining, from a third sensor in a third sensing module that is mounted on the vehicle and is detached from the first sensing module and the second sensing module, third sensing data indicative of a third position parameter of the third sensor relative to the calibration target,
   wherein the third sensing module includes a third mounting plate that is detached from the first mounting plate and the second mounting plate, and carries the third sensor of the set of sensors, and
determining a second relative position of the first sensor or the second sensor relative to the third sensor based on the first position parameter, the second position parameter and the third position parameter.

18. The method of claim 11, wherein the first sensing data or the second sensing data includes at least one of:
a measurement indicating a distance between the calibration target and the first sensor or the second sensor; or
imaging data depicting a size or a shape of the calibration target from a point of view at the first sensor or the second sensor.

* * * * *